US011485411B2

(12) United States Patent
Kodera

(10) Patent No.: US 11,485,411 B2
(45) Date of Patent: Nov. 1, 2022

(54) CONTROLLER FOR STEERING DEVICE

(71) Applicant: JTEKT CORPORATION, Osaka (JP)

(72) Inventor: Takashi Kodera, Okazaki (JP)

(73) Assignee: JTEKT CORPORATION, Kariya (JP)

( * ) Notice: Subject to any disclaimer, the term of this patent is extended or adjusted under 35 U.S.C. 154(b) by 150 days.

(21) Appl. No.: 16/663,563

(22) Filed: Oct. 25, 2019

(65) Prior Publication Data

US 2020/0130739 A1 Apr. 30, 2020

(30) Foreign Application Priority Data

Oct. 30, 2018 (JP) .............................. JP2018-204099
Oct. 30, 2018 (JP) .............................. JP2018-204103

(51) Int. Cl.
*B62D 6/00* (2006.01)
*B62D 5/04* (2006.01)

(52) U.S. Cl.
CPC ........... *B62D 6/008* (2013.01); *B62D 5/0463* (2013.01); *B62D 5/0487* (2013.01)

(58) Field of Classification Search
CPC ..... B62D 6/008; B62D 5/0463; B62D 5/0487
See application file for complete search history.

(56) References Cited

U.S. PATENT DOCUMENTS

| 2014/0303850 A1* | 10/2014 | Chai | ...................... | B62D 6/008 |
| | | | | 701/42 |
| 2014/0316658 A1* | 10/2014 | Chai | ...................... | B62D 6/008 |
| | | | | 701/42 |
| 2019/0100241 A1* | 4/2019 | Kudo | ...................... | B62D 6/008 |

FOREIGN PATENT DOCUMENTS

| DE | 112015003950 T5 * | 5/2017 | ............... B62D 6/00 |
| EP | 2944542 A1 | 11/2015 | |
| EP | 3210856 A2 * | 8/2017 | ........... B62D 5/0463 |
| EP | 3219580 A1 * | 9/2017 | ........... B62D 5/0463 |
| JP | 2011-111080 A | 6/2011 | |
| JP | 2014-000943 A | 1/2014 | |
| WO | 2013/061567 A1 | 5/2013 | |

OTHER PUBLICATIONS

Machine translation of DE-112015003950-T5 (Year: 2017).*
Mar. 26, 2020 Search Report issued in European Patent Application 19205942.6.

* cited by examiner

*Primary Examiner* — Nicholas Kiswanto
*Assistant Examiner* — Mohamad O El Sayah
(74) *Attorney, Agent, or Firm* — Oliff PLC

(57) ABSTRACT

A controller for a steering device includes an electronic control unit configured to control the steering device. The electronic control unit is configured to acquire an action force and to calculate a basic reaction force based on the acquired action force. The action force includes at least two of axial forces of a plurality of types and a tire force. The axial forces of a plurality of types are applied to a turning shaft that is connected to turning wheels. The tire force is applied to the turning wheels. The electronic control unit is configured to, when one predetermined force of the acquired action force is abnormal, calculate the basic reaction force such that a contribution proportion of the predetermined force to the basic reaction force is lower than a contribution proportion when the predetermined force is not abnormal.

20 Claims, 12 Drawing Sheets

CONTROLLER FOR STEERING DEVICE

INCORPORATION BY REFERENCE

The disclosure of Japanese Patent Application No. 2018-204099 filed on Oct. 30, 2018 and Japanese Patent Application No. 2018-204103 filed on Oct. 30, 2018, each including the specification, drawings and abstract, is incorporated herein by reference in its entirety.

BACKGROUND

1. Technical Field

The disclosure relates to a controller for a steering device.

2. Description of Related Art

As a type of steering device, there is a steer-by-wire type steering device in which a steering unit that is steered by a driver and a turning unit that turns turning wheels according to a driver's steering between which power is transmitted are separated from each other. In such a steering device, a road-surface reaction force or the like which is applied to the turning wheels is not mechanically transmitted to a steering wheel. Therefore, in a steering control system of which a control object is the same type of steering device, road-surface information is delivered to a driver by applying a steering reaction force in which a road-surface reaction force or the like is reflected to a steering wheel using a steering-side actuator (a steering-side motor).

For example, WO 2013/061567 discloses a steering control system that calculates a steering reaction force based on distributed axial forces to which axial forces of a plurality of types are distributed with attention paid to an axial force acting on a turning shaft which is connected to turning wheels. In WO 2013/061567, an angle axial force based on a steering angle of a steering wheel, a current axial force based on a driving current of a turning-side motor which is a drive source of a turning-side actuator, a lateral G axial force based on a lateral acceleration acting on the turning wheels, a yaw rate axial force based on a yaw rate of a vehicle, and the like are exemplified as such an axial force, and a steering reaction force is calculated based on distributed axial forces in which these axial forces are distributed.

SUMMARY

In the above-mentioned configuration according to the related art, for example, when an abnormality occurs in a sensor that detects a value serving as a basis for calculating one of axial forces of a plurality of types and the one axial force has an erroneous value, an actual road-surface reaction force is not accurately reflected in the distributed axial forces. As a result, there is concern of an abnormal steering reaction force being applied and thus there is room for improvement in this regard.

The disclosure provides a controller for a steering device that can prevent an abnormal steering reaction force from being applied.

An aspect of the disclosure is a controller for a steering device. The controller includes an electronic control unit configured to control the steering device. The electronic control unit is configured to acquire an action force and to calculate a basic reaction force based on the action force. The action force includes at least two of axial forces of a plurality of types and a tire force. The axial forces of a plurality of types are applied to a turning shaft that is connected to turning wheels. The tire force is applied to the turning wheels. The electronic control unit is configured to, when one predetermined force of the action force is abnormal, calculate the basic reaction force such that a contribution proportion of the predetermined force to the basic reaction force is lower than a contribution proportion to the basic reaction force when the predetermined force is not abnormal.

With this configuration, it is possible to prevent an abnormal steering reaction force from being applied.

In the controller for the steering device, the electronic control unit may be configured to control the steering device having a structure in which a steering unit and a turning unit that turns the turning wheels in accordance with steering which is input to the steering unit are mechanically separated from each other. The electronic control unit may be configured to control operation of a steering-side motor that provides a steering reaction force. The steering reaction force may be a force resisting the steering which is input to the steering unit. The electronic control unit may be configured to calculate a target steering angle using a reaction component based on the basic reaction force. The target steering angle may be a target value of a steering angle of a steering wheel that is connected to the steering unit. The electronic control unit may be configured to calculate a target reaction torque based on execution of angle feedback control. The angle feedback control may cause the steering angle to follow the target steering angle. The target reaction torque may be a target value of the steering reaction force.

In the controller for the steering device, the electronic control unit may be configured to control the steering device having a structure in which a steering unit and a turning unit that turns the turning wheels in accordance with steering which is input to the steering unit are mechanically separated from each other. The electronic control unit may be configured to control operation of a steering-side motor that provides a steering reaction force. The steering reaction force may be a force resisting the steering which is input to the steering unit. The electronic control unit may be configured to calculate a target reaction torque based on a steering torque which is applied to the steering unit and a reaction component based on the basic reaction force. The target reaction torque may be a target value of the steering reaction force.

In the controller for the steering device, the electronic control unit may be configured to control the steering device having a structure in which a steering unit and a turning unit that turns the turning wheels in accordance with steering which is input to the steering unit are mechanically separated from each other. The electronic control unit may be configured to control operation of a steering-side motor that provides a steering reaction force. The steering reaction force may be a force resisting the steering which is input to the steering unit. The electronic control unit may be configured to calculate a target reaction torque using a reaction component based on the basic reaction force. The target reaction torque may be a target value of the steering reaction force.

With these configurations, since an influence (contribution) of an abnormal axial force or tire force on a value of the basic reaction force decreases, it is possible to prevent the target reaction torque which is calculated using the basic reaction force from being an abnormal value and to prevent an abnormal steering reaction force from being applied.

In the controller for the steering device, the electronic control unit may be configured to, when the predetermined force is abnormal, calculate the basic reaction force such that the contribution proportion of the predetermined force to the basic reaction force is zero.

With this configuration, since an influence of an abnormal axial force or tire force on the value of the basic reaction force is removed, it is possible to appropriately prevent the target reaction torque which is calculated based on the basic reaction force from being an abnormal value.

In the controller for the steering device, the electronic control unit may be configured to, when the predetermined force is abnormal, calculate the basic reaction force such that a contribution proportion of a force other than the predetermined force to the basic reaction force is higher than the contribution proportion of the force other than the predetermined force to the basic reaction force when the predetermined force is not abnormal.

With this configuration, it is possible to prevent the magnitude of the steering reaction force from changing between before and after an abnormality occurs in one of axial forces of a plurality of types and a tire force and to prevent a driver from feeling uncomfortable.

With the above-mentioned configurations, it is possible to prevent an abnormal steering reaction force from being applied.

In the controller for the steering device, the electronic control unit may be configured to control the steering device that applies an assist force for assisting a steering operation to a steering mechanism using an assist mechanism with a motor as a drive source. The electronic control unit may be configured to calculate a first assist component based on a steering torque. The electronic control unit may be configured to calculate a target rotation angle using a reaction component based on the basic reaction force. The target rotation angle may be a target of a rotation angle of a rotation shaft which is able to convert a turning angle of the turning wheels. The electronic control unit may be configured to calculate a second assist component through execution of angle feedback control based on the rotation angle and the target rotation angle. The electronic control unit may be configured to control operation of the motor such that an assist force according to an assist command value based on the first assist component and the second assist component is generated.

In the controller for the steering device, the electronic control unit may be configured to control the steering device that applies an assist force for assisting a steering operation to a steering mechanism using an assist mechanism with a motor as a drive source. The electronic control unit may be configured to calculate a torque command value. The torque command value may be a target value of a steering torque which is to be input to the steering mechanism. The electronic control unit may be configured to calculate a first assist component through execution of torque feedback control based on the steering torque and the torque command value. The electronic control unit may be configured to calculate a target rotation angle using a reaction component based on the basic reaction force and the first assist component. The target rotation angle may be a target of a rotation angle of a rotation shaft which is able to convert a turning angle of the turning wheels. The electronic control unit may be configured to calculate a second assist component through execution of angle feedback control based on the rotation angle and the target rotation angle. The electronic control unit may be configured to control operation of the motor such that an assist force according to an assist command value based on the second assist component is generated.

In the controller for the steering device, the electronic control unit may be configured to control the steering device that applies an assist force for assisting a steering operation to a steering mechanism using an assist mechanism with a motor as a drive source. The electronic control unit may be configured to calculate a torque command value using a reaction component based on the basic reaction force. The torque command value may be a target value of a steering torque which is to be input to the steering mechanism. The electronic control unit may be configured to calculate an assist command value through execution of torque feedback control based on the steering torque and the torque command value. The electronic control unit may be configured to control operation of the motor such that an assist force according to the assist command value is generated.

With these configurations, the assist command value changes with change of the basic reaction force (the reaction component) based on a road-surface state. In the configurations, when an abnormality occurs in one of the axial forces and the tire force, an influence (contribution) of the abnormal axial force or tire force on the value of the basic reaction force decreases and thus it is possible to prevent the assist command value (the assist force) from being an abnormal value. Accordingly, even when a road-surface reaction force which is transmitted to the steering wheel is adjusted based on change of the assist command value, it is possible to prevent the road-surface reaction force from being inappropriately adjusted.

In the controller for the steering device, the electronic control unit may be configured to, when the predetermined force is abnormal, calculate the basic reaction force such that the contribution proportion of the predetermined force to the basic reaction force is zero.

With this configuration, since an influence of an abnormal axial force or tire force on the value of the basic reaction force is removed, it is possible to appropriately prevent the assist command value from being an abnormal value. Accordingly, it is possible to appropriately prevent the road-surface reaction force which is transmitted to the steering wheel from being inappropriately adjusted.

In the controller for the steering device, the electronic control unit may be configured to, when the predetermined force is abnormal, calculate the basic reaction force such that a contribution proportion of a force other than the predetermined force to the basic reaction force is higher than a contribution proportion of the force other than the predetermined force to the basic reaction force when the predetermined force is not abnormal.

With this configuration, it is possible to prevent the magnitude of the steering reaction force from changing between before and after an abnormality occurs in one of axial forces of a plurality of types and a tire force and to prevent a driver from feeling uncomfortable.

With the above-mentioned embodiments, it is possible to prevent a road-surface reaction force which is applied to a steering wheel from being inappropriately adjusted.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
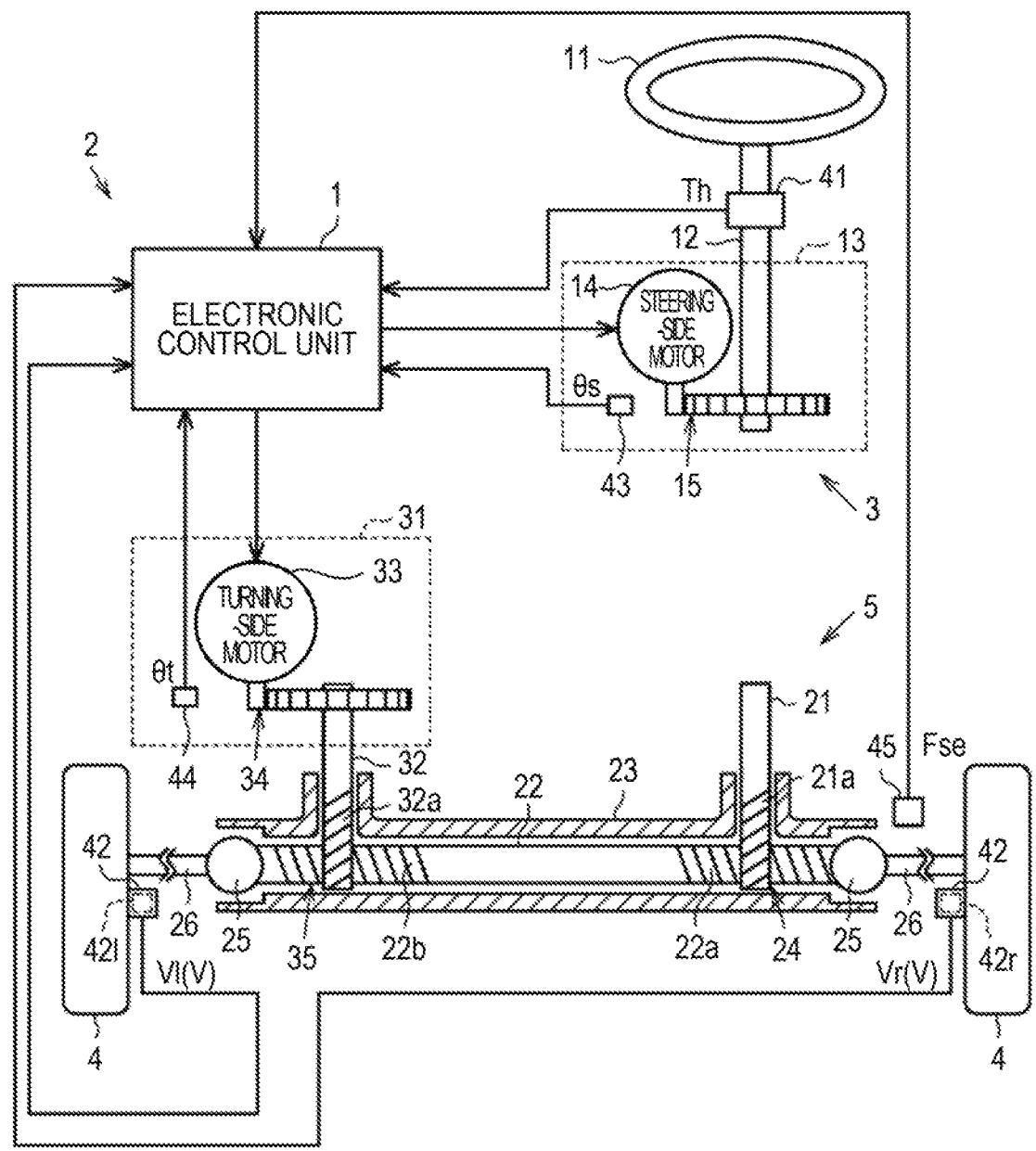
FIG. 1 is a diagram schematically illustrating a configuration of a steer-by-wire steering device according to a first embodiment.

Hereinafter, a controller for a steering device according to a first embodiment will be described with reference to the accompanying drawings. As illustrated in FIG. 1, a steer-by-wire steering device 2 which is a control object of a controller (Electronic Control Unit: ECU) 1 includes a steering unit 3 that is steered by a driver and a turning unit 5 that turns turning wheels 4 according to a driver's steering of the steering unit 3.

The steering unit 3 includes a steering shaft 12 to which a steering wheel 11 is fixed and a steering-side actuator 13 that can apply a steering reaction force to the steering shaft 12. The steering-side actuator 13 includes a steering-side motor 14 that serves as a drive source and a steering-side reduction gear 15 that reduces rotation of the steering-side motor 14 and transmits the reduced rotation to the steering shaft 12. The steering-side motor 14 according to this embodiment employs, for example, a three-phase brushless motor.

The turning unit 5 includes a first pinion shaft 21 serving as a rotation shaft that can convert a turning angle of the turning wheels 4, a rack shaft 22 that is connected to the first pinion shaft 21, and a rack housing 23 that accommodates the rack shaft 22 therein such that it can reciprocate therein. The first pinion shaft 21 and the rack shaft 22 are arranged to have a predetermined crossing angle, and first pinion teeth 21a formed in the first pinion shaft 21 and first rack teeth 22a formed in the rack shaft 22 engage with each other to constitute a first rack and pinion mechanism 24. One end in an axial direction of the rack shaft 22 is movably supported by the first rack and pinion mechanism 24. Tie rods 26 are connected to both ends of the rack shaft 22 via rack ends 25 formed of ball joints, and the tips of the tie rods 26 are connected to knuckles (not illustrated) which are assembled to the turning wheels 4.

In the turning unit 5, a turning-side actuator 31 that applies a turning force for turning the turning wheels 4 to the rack shaft 22 is provided via a second pinion shaft 32. The turning-side actuator 31 includes a turning-side motor 33 that serves as a drive source and a turning-side reduction gear 34 that reduces rotation of the turning-side motor 33 and transmits the reduced rotation to the second pinion shaft 32. The second pinion shaft 32 and the rack shaft 22 are arranged to have a predetermined crossing angle, and second pinion teeth 32a formed in the second pinion shaft 32 and second rack teeth 22b formed in the rack shaft 22 engage with each other to constitute a second rack and pinion mechanism 35. The other end in the axial direction of the rack shaft 22 is movably supported by the second rack and pinion mechanism 35. The turning-side motor 33 according to this embodiment employs, for example, a three-phase brushless motor.

In the steering device 2 having the above-mentioned configuration, the second pinion shaft 32 is rotationally driven by the turning-side actuator 31 according to a driver's steering operation, and this rotation is converted to movement in the axial direction of the rack shaft 22 by the second rack and pinion mechanism 35, whereby the turning angle of the turning wheels 4 are changed. At this time, a steering reaction force that resists the driver's steering is applied to the steering wheel 11 from the steering-side actuator 13.

An electrical configuration of this embodiment will be described below. The electronic control unit 1 is connected to the steering-side actuator 13 (the steering-side motor 14) and the turning-side actuator 31 (the turning-side motor 33) and controls operation thereof. The electronic control unit 1 includes a central processing unit (CPU) and a memory which are not illustrated and executes various controls by causing the CPU to execute a program stored in the memory in a predetermined operation cycle.

A torque sensor 41 that detects a steering torque Th applied to the steering shaft 12 is connected to the electronic control unit 1. The torque sensor 41 is provided closer to the steering wheel 11 than a part of the steering shaft 12 which is connected to the steering-side actuator 13 (the steering-side reduction gear 15). A left front-wheel sensor 42l and a right front-wheel sensor 42r that are provided respectively in hub units 42 that rotatably support the turning wheels 4 via a driver shaft (not illustrated) are connected to the electronic control unit 1. The left front-wheel sensor 42l and the right front-wheel sensor 42r detect wheel speeds Vl and Vr of the turning wheels 4, respectively. The electronic control unit 1 according to this embodiment detects a mean value of the wheel speeds Vl and Vr as a vehicle speed V. A steering-side rotation sensor 43 that detects a rotation angle θs of the steering-side motor 14 in a relative angle in a range of 360° as a detection value indicating an amount of steering of the steering unit 3 and a turning-side rotation sensor 44 that detects a rotation angle θt of the turning-side motor 33 in a relative angle as a detection value indicating an amount of turning of the turning unit 5 are also connected to the electronic control unit 1. An axial force sensor 45 that acquires a sensor axial force Fse which is a detection value of an axial force applied to the rack shaft 22 is also connected to the electronic control unit 1. For example, a sensor that detects an axial force based on change of a pressure according to a stroke of the rack shaft 22 can be employed as the axial force sensor 45. The electronic control unit 1 acquires the sensor axial force Fse in the dimension of torque (N·m). The steering torque Th and the rotation angles θs and θt are detected as being positive values when the steering wheel 11 is steered in one direction (rightwards in this embodiment) and as being negative values when the steering wheel 11 is steered in the other direction (leftwards in this embodiment). The electronic control unit 1 controls operation of the steering-side motor 14 and the turning-side motor 33 based on such various state quantities.

Figure 2:
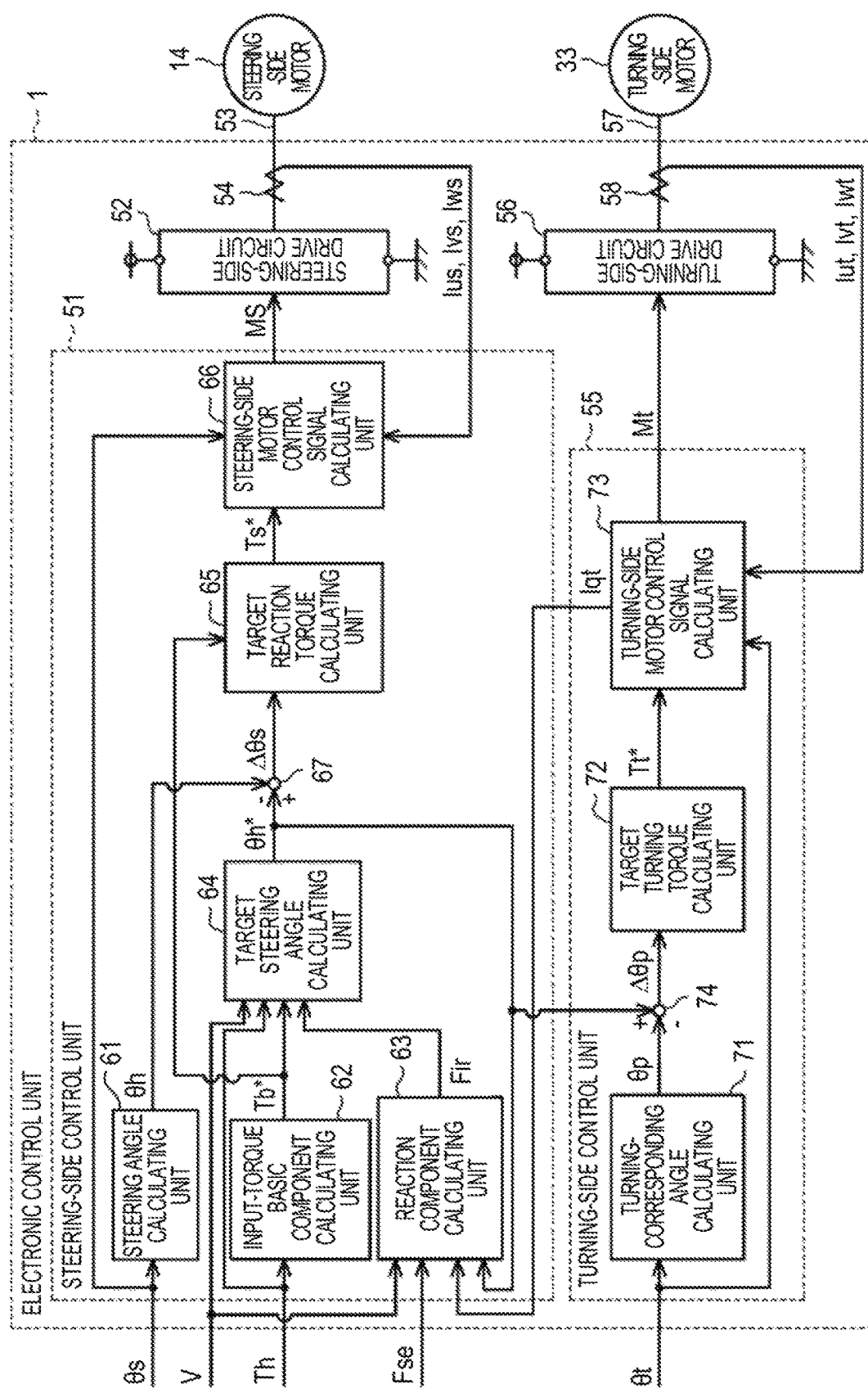
FIG. 2 is a block diagram of a controller for a steering device according to the first embodiment.

The configuration of the electronic control unit 1 will be described below in detail. As illustrated in FIG. 2, the electronic control unit 1 includes a steering-side control unit 51 serving as a control unit that outputs a steering-side motor control signal Ms and a steering-side drive circuit 52 that supplies a drive power to the steering-side motor 14 based on the steering-side motor control signal Ms. Current sensors 54 that detect phase current values Ius, Ivs, and Iws of the steering-side motor 14 which flow in connection lines 53 between the steering-side drive circuit 52 and motor coils of phases of the steering-side motor 14 are connected to the steering-side control unit 51. In FIG. 2, for the purpose of convenience of explanation, the connection lines 53 of phases and the current sensors 54 of phases are collectively illustrated as being single.

The electronic control unit 1 includes a turning-side control unit 55 that outputs a turning-side motor control signal Mt and a turning-side drive circuit 56 that supplies a drive power to the turning-side motor 33 based on the turning-side motor control signal Mt. Current sensors 58 that detect phase current values Iut, Ivt, and Iwt of the turning-side motor 33 which flow in connection lines 57 between the turning-side drive circuit 56 and motor coils of phases of the turning-side motor 33 are connected to the turning-side control unit 55. In FIG. 2, for the purpose of convenience of explanation, the connection lines 57 of phases and the current sensors 58 of phases are collectively illustrated as being single. A known PWM inverter including a plurality of switching elements (for example, FETs) is employed by the steering-side drive circuit 52 and the turning-side drive circuit 56 according to this embodiment. The steering-side motor control signal Ms and the turning-side motor control signal Mt are gate-on/off signals that define ON/OFF states of the switching elements.

The electronic control unit 1 supplies drive powers to the steering-side motor 14 and the turning-side motor 33 by outputting the steering-side motor control signal Ms and the turning-side motor control signal Mt to the steering-side drive circuit 52 and the turning-side drive circuit 56. Accordingly, the electronic control unit 1 controls operations of the steering-side actuator 13 and the turning-side actuator 31.

The configuration of the steering-side control unit 51 will be first described below. The steering-side control unit 51 performs arithmetic operation processes represented by the following control blocks in a predetermined operation cycle to calculate the steering-side motor control signal Ms. The vehicle speed V, the steering torque Th, the rotation angle θs, the sensor axial force Fse, the phase current values Ius, Ivs, and Iws, and a q-axis current value Iqt which is a drive current of the turning-side motor 33 which will be described later are input to the steering-side control unit 51. Then, the steering-side control unit 51 calculates the steering-side motor control signal Ms based on these state quantities and outputs the generated steering-side motor control signal Ms.

Specifically, the steering-side control unit 51 includes a steering angle calculating unit 61 that calculates a steering angle θh of the steering wheel 11 based on the rotation angle θs of the steering-side motor 14. The steering-side control unit 51 further includes an input-torque basic component calculating unit 62 that calculates an input-torque basic component Tb* which is a force for rotating the steering wheel 11 in a driver's steering direction and a reaction component calculating unit 63 that calculates a reaction component Fir which is a force resisting the rotation of the steering wheel 11 by a driver's steering. The steering-side control unit 51 further includes a target steering angle calculating unit 64 that calculates a target steering angle θh* based on the steering torque Th, the input-torque basic component Tb*, the reaction component Fir, and the vehicle speed V. The steering-side control unit 51 further includes a target reaction torque calculating unit 65 that calculates a target reaction torque Ts* based on the steering angle θh and the target steering angle θh* and a steering-side motor control signal calculating unit 66 that calculates the steering-side motor control signal Ms based on the target reaction torque Ts*.

The steering angle calculating unit 61 converts the input rotation angle θs into an absolute angle in a range greater than 360°, for example, by counting the number of turns of the steering-side motor 14 from a steering neutral position, and acquires the absolute angle. The steering angle calculating unit 61 calculates the steering angle θh by multiplying a conversion factor Ks based on a rotation speed ratio of the steering-side reduction gear 15 by the rotation angle which has been converted into the absolute angle.

The steering torque Th is input to the input-torque basic component calculating unit 62. The input-torque basic component calculating unit 62 calculates the input-torque basic component (a reaction-force basic component) Tb* which has a larger absolute value as the absolute value of the steering torque Th becomes larger. The calculated input-torque basic component Tb* is input to the target steering angle calculating unit 64 and the target reaction torque calculating unit 65.

A reaction component Fir which is calculated by the reaction component calculating unit 63 which will be described later is input to the target steering angle calculating unit 64 in addition to the steering torque Th, the vehicle speed V, and the input-torque basic component Tb*. The target steering angle calculating unit 64 calculates a target steering angle θh* using a model (steering model) formula in which the target steering angle θh* is correlated with an input torque Tin* which is obtained by adding the steering torque Th to the input-torque basic component Tb* and subtracting the reaction component Fir therefrom. This model formula defines and represents a relationship between an input torque to a rotation shaft rotating with rotation of the steering wheel 11 and the rotation angle of the rotation shaft in a structure in which the steering wheel 11 (the steering unit 3) and the turning wheels 4 (the turning unit 5) are mechanically connected. This model formula is expressed using a stickiness coefficient C modeling friction or the like of the steering device 2 and an inertia coefficient J modeling the inertia of the steering device 2. The stickiness coefficient C and the inertia coefficient J are set to vary depending on the vehicle speed V. The target steering angle θh* which is calculated using the model formula is output to the reaction component calculating unit 63 in addition to a subtractor 67 and the turning-side control unit 55.

$$Tin^* = C \cdot \theta h^{*\prime} + J \cdot \theta h^{*\prime\prime} \quad (1)$$

This model formula defines and represents a relationship between a torque of a rotation shaft rotating with rotation of the steering wheel 11 and the rotation angle of the rotation shaft in a structure in which the steering wheel 11 (the steering unit 3) and the turning wheels 4 (the turning unit 5) are mechanically connected. This model formula is expressed using a stickiness coefficient C modeling friction or the like of the steering device 2 and an inertia coefficient J modeling the inertia of the steering device 2. The stickiness coefficient C and the inertia coefficient J are set to vary depending on the vehicle speed V. The target steering angle θh* which is calculated using the model formula is output to the reaction component calculating unit 63 in addition to a subtractor 67 and the turning-side control unit 55.

An angle deviation Δθs obtained by causing the subtractor 67 to subtract the steering angle θh from the target steering angle θh* is input to the target reaction torque calculating unit 65 in addition to the input-torque basic component Tb*. Then, the target reaction torque calculating unit 65 calculates a basic reaction torque serving as a basis of the steering reaction force which is given by the steering-side motor 14 as a control value for feedback controlling the steering angle θh to the target steering angle θh* based on the angle deviation Δθs, and calculates the target reaction torque Ts* by adding the input-torque basic component Tb* to the basic reaction torque. Specifically, the target reaction torque calculating unit 65 calculates the sum of output values of a proportional element, an integral element, and a differential element with the angle deviation Δθs as an input as the basic reaction torque.

The rotation angle θs and the phase current values Ius, Ivs, and Iws in addition to the target reaction torque Ts* are input to the steering-side motor control signal calculating unit 66. The steering-side motor control signal calculating unit 66 calculates a q-axis target current value Iqs* on the q axis in a d/q coordinate system based on the target reaction torque Ts*. In this embodiment, a d-axis target current value Ids* on the d axis is basically set to zero.

The steering-side motor control signal calculating unit 66 calculates a steering-side motor control signal Ms by executing current feedback control in the d/q coordinate system. Specifically, the steering-side motor control signal calculating unit 66 calculates a d-axis current value Ids and a q-axis current value Iqs which are actual current values of the steering-side motor 14 in the d/q coordinate system by mapping the phase current values Ius, Ivs, and Iws onto the d/q coordinates based on the rotation angle θs. Then, the steering-side motor control signal calculating unit 66 calculates a voltage command value based on a current deviation between the d axis and the q axis such that the d-axis current value Ids follows the d-axis target current value Ids* and such that the q-axis current value Iqs follows the q-axis target current value Iqs*. Then, the steering-side motor control signal calculating unit 66 calculates the steering-side motor control signal Ms having a duty ratio based on the voltage command value and outputs the calculated steering-side motor control signal Ms to the steering-side drive circuit 52. Accordingly, the electronic control unit 1 outputs a drive power corresponding to the steering-side motor control signal Ms to the steering-side motor 14 and controls the operation thereof.

The turning-side control unit 55 will be described below. The turning-side control unit 55 calculates a turning-side motor control signal Mt by performing arithmetic operation processes represented by the following control blocks in a predetermined operation cycle. The rotation angle θt, the target steering angle θh*, and the phase current values Iut, Ivt, and Iwt of the turning-side motor 33 are input to the turning-side control unit 55. Then, the turning-side control unit 55 calculates the turning-side motor control signal Mt based on these state quantities and outputs the generated turning-side motor control signal Mt.

Specifically, the turning-side control unit 55 includes a turning-corresponding angle calculating unit 71 that calculates a turning-corresponding angle θp corresponding to a rotation angle (a pinion angle) of the first pinion shaft 21 which is a rotation shaft which can convert a turning angle of the turning wheels 4. The turning-side control unit 55 further includes a target turning torque calculating unit 72 that calculates a target turning torque Tt* based on the turning-corresponding angle θp and the target steering angle θh* and a turning-side motor control signal calculating unit 73 that calculates the turning-side motor control signal Mt based on the target turning torque Tt*. In the steering device 2 according to this embodiment, a steering angle ratio which is a ratio between the steering angle θh and the turning-corresponding angle θp is set to be constant and a target turning-corresponding angle is the same as the target steering angle θh*.

The turning-corresponding angle calculating unit 71 converts the input rotation angle θt into an absolute angle, for example, by counting the number of turns of the turning-side motor 33 from the steering neutral position, and acquires the absolute angle. The turning-corresponding angle calculating unit 71 calculates the turning-corresponding angle θp by multiplying a conversion factor Kt based on a rotation speed ratio of the turning-side reduction gear 34 and a rotation speed ratio of the first and second rack and pinion mechanisms 24 and 35 by the rotation angle which has been converted into the absolute angle. That is, the turning-corresponding angle θp corresponds to the steering angle θh of the steering wheel 11 when it is assumed that the first pinion shaft 21 is connected to the steering shaft 12.

An angle deviation Δθp obtained by causing the subtractor 74 to subtract the turning-corresponding angle θp from the target steering angle θh* (the target turning-corresponding angle) is input to the target turning torque calculating unit 72. Then, the target turning torque calculating unit 72 calculates a target turning torque Tt* which is a target value of a turning force given by the turning-side motor 33 as a control value for feedback controlling the turning-corresponding angle θp to the target steering angle θh* based on the angle deviation Δθp. Specifically, the target turning torque calculating unit 72 calculates the sum of output values of a proportional element, an integral element, and a differential element with the angle deviation Δθp as an input as the target turning torque Tt*.

The rotation angle θt and the phase current values Iut, Ivt, and Iwt in addition to the target turning torque Tt* are input to the turning-side motor control signal calculating unit 73. The turning-side motor control signal calculating unit 73 calculates a q-axis target current value Iqt* on the q axis in the d/q coordinate system based on the target turning torque Tt*. In this embodiment, a d-axis target current value Idt* on the d axis is basically set to zero.

The turning-side motor control signal calculating unit 73 calculates the turning-side motor control signal Mt by executing current feedback control in the d/q coordinate system. Specifically, the turning-side motor control signal calculating unit 73 calculates a d-axis current value Idt and a q-axis current value Iqt which are actual current values of the turning-side motor 33 in the d/q coordinate system by mapping the phase current values Iut, Ivt, and Iwt onto the d/q coordinates based on the rotation angle θt. Then, the turning-side motor control signal calculating unit 73 calculates a voltage command value based on a current deviation between the d axis and the q axis such that the d-axis current value Idt follows the d-axis target current value Idt* and such that the q-axis current value Iqt follows the q-axis target current value Iqt*. Then, the turning-side motor control signal calculating unit 73 calculates the turning-side motor control signal Mt having a duty ratio based on the voltage command value and outputs the calculated turning-side motor control signal Mt to the turning-side drive circuit 56. Accordingly, the electronic control unit 1 outputs a drive power corresponding to the turning-side motor control signal Mt to the turning-side motor 33 and controls the operation thereof. The q-axis current value Iqt which is calculated in the process of calculating the turning-side motor control signal Mt is output to the reaction component calculating unit 63.

The configuration of the reaction component calculating unit 63 will be described below. The vehicle speed V, the sensor axial force Fse, the q-axis current value Iqt of the turning-side motor 33, and the target steering angle θh* are input to the reaction component calculating unit 63. The reaction component calculating unit 63 calculates a reaction component Fir corresponding to an axial force acting on the rack shaft 22 based on these state quantities and outputs the calculated reaction component Fir to the target steering angle calculating unit 64.

Figure 3:
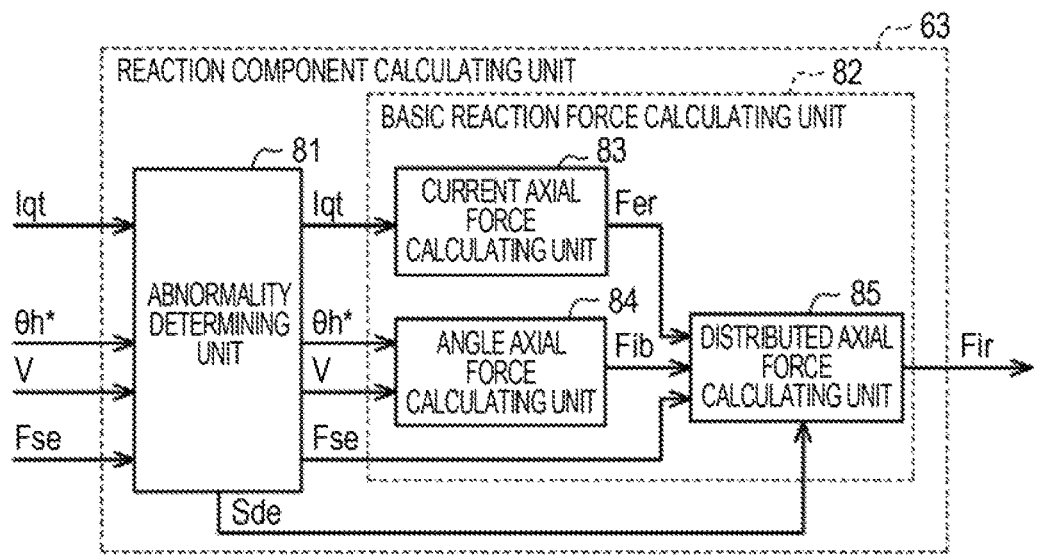
FIG. 3 is a block diagram illustrating a reaction component calculating unit according to the first embodiment.

As illustrated in FIG. 3, the reaction component calculating unit 63 includes an abnormality determining unit 81 that determines whether an input state quantity (signal) is abnormal and a basic reaction force calculating unit 82 that calculates a base reaction force which is the reaction force component Fir based on the state quantities.

The vehicle speed V, the sensor axial force Fse, the q-axis current value Iqt, and the target steering angle θh* are input to the abnormality determining unit 81. The abnormality determining unit 81 determines whether each input state quantity is abnormal using a method of determining that there is an abnormality, for example, when the state quantity has an impossible value or when a change from a previous value is greater than a predetermined threshold value. Then, the abnormality determining unit 81 outputs the vehicle speed V, the sensor axial force Fse, the q-axis current value Iqt, and the target steering angle θh* which have been input thereto in addition to a determination signal Sde indicating a result of abnormality determination to the basic reaction force calculating unit 82.

The basic reaction force calculating unit 82 includes a current axial force calculating unit 83 that calculates a current axial force (road-surface axial force) Fer and an angle axial force calculating unit 84 that calculates an angle axial force (ideal axial force) Fib. The current axial force Fer and the angle axial force Fib are calculated in the dimension of a torque (N·m). The basic reaction force calculating unit 82 includes a distributed axial force calculating unit 85 that calculates a distributed axial force which is obtained by distributing the current axial force Fer, the angle axial force Fib, and the sensor axial force Fse at predetermined proportions as a reaction component Fir (a basic reaction force) such that an axial force which is applied to the turning wheels 4 from a road surface (road surface information which is transmitted from the road surface) is reflected therein.

The q-axis current value Iqt of the turning-side motor 33 is input to the current axial force calculating unit 83. The current axial force calculating unit 83 calculates the current axial force Fer which is an estimated value of the axial force which is applied to the turning wheels 4 (a force which is transmitted to the turning wheels 4) and in which road surface information is reflected based on the q-axis current value Iqt. Specifically, the current axial force calculating unit 83 calculates the current axial force Fer such that the absolute value thereof increases as the absolute value of the q-axis current value Iqt increases in a state in which the torque applied to the rack shaft 22 from the turning-side motor 33 and the torque corresponding to the force which is applied to the turning wheels 4 from the road surface are balanced with each other. The calculated current axial force Fer is output to the distributed axial force calculating unit 85.

The target steering angle θh* (the target turning-corresponding angle) and the vehicle speed V are input to the angle axial force calculating unit 84. The angle axial force calculating unit 84 calculates the angle axial force Fib which is an ideal value of the axial force which is applied to the turning wheels 4 (a force which is transmitted to the turning wheels 4) and in which road surface information is not reflected based on the target steering angle θh*. Specifically, the angle axial force calculating unit 84 calculates the angle axial force Fib such that the absolute value thereof increases as the absolute value of the target steering angle θh* increases. The angle axial force calculating unit 84 calculates the angle axial force Fib such that the absolute value thereof increases as the vehicle speed V increases. The calculated angle axial force Fib is output to the distributed axial force calculating unit 85.

The sensor axial force Fse in addition to the determination signal Sde, the current axial force Fer, and the angle axial force Fib are input to the distributed axial force calculating unit 85. In the distributed axial force calculating unit 85, a current distribution gain Ger indicating a distribution proportion of the current axial force Fer, an angle distribution gain Gib indicating a distribution proportion of the angle axial force Fib, and a sensor distribution gain Gse indicating a distribution proportion of the sensor axial force Fse are set in advance by experiment or the like. Then, the distributed axial force calculating unit 85 calculates the reaction component Fir by totally summing a value obtained by multiplying the angle axial force Fib by the angle distribution gain Gib, a value obtained by multiplying the current axial force Fer by the current distribution gain Ger, and a value obtained by multiplying the sensor axial force Fse by the sensor distribution gain Gse. That is, the basic reaction force calculating unit 82 in this embodiment acquires three axial forces including the current axial force Fer, the angle axial force Fib, and the sensor axial force Fse and calculates the reaction component Fir (the basic reaction force) based on the three axial forces.

Here, the distribution gains Ger, Gib, and Gse are set to different values depending on the determination result indicated by the determination signal Sde. Specifically, when an acquired state quantity is abnormal, a distribution gain which is multiplied by an axial force based on the abnormal state quantity is set to decrease in comparison with a case in which there is no abnormality and distribution gains which are multiplied by axial forces based on normal quantities are set to increase in comparison with a case in which there is no abnormality. That is, the basic reaction force calculating unit 82 in this embodiment determines that an axial force is abnormal when a state quantity for calculating the axial force is abnormal. When an acquired state quantity is abnormal, the distribution gains Ger, Gib, and Gse are set such that a contribution proportion of an axial force based on the abnormal state quantity (an abnormal axial force) to the reaction component Fir decreases and a contribution proportion of axial forces based on normal state quantities (normal axial forces) to the reaction component Fir increases.

For example, the current distribution gain Ger is set to "0.3" when the state quantities are normal, "0" when the q-axis current value Iqt is abnormal, and "0.45" when a state quantity (at least one of the target steering angle θh*, the vehicle speed V, and the sensor axial force Fse) other than the q-axis current value Iqt is abnormal. The angle distribution gain Gib is set to "0.45" when the state quantities are normal, "0" when at least one of the target steering angle θh* and the vehicle speed V is abnormal, and "0.6" when a state quantity (at least one of the q-axis current value Iqt and the sensor axial force Fse) other than the target steering angle θh* and the vehicle speed V is abnormal. The sensor distribution gain Gse is set to "0.7" when the state quantities are normal, "0" when the sensor axial force Fse is abnormal, and "0.9" when a state quantity (at least one of the target steering angle θh*, the vehicle speed V, and the q-axis current value Iqt) other than the sensor axial force Fse is abnormal. The values of the distribution gains Ger, Gib, and Gse can vary appropriately and may be set such that the sum thereof becomes "1" or may be set such that the sum thereof is greater or less than "1."

Operations and advantages of this embodiment will be described below. When one of the current axial force Fer, the angle axial force Fib, and the sensor axial force Fse is abnormal, the basic reaction force calculating unit 82 sets the distribution gain Ger, Gib, or Gse which is multiplied by the abnormal axial force to zero, whereby the contribution proportion of the abnormal axial force to the reaction component Fir (the basic reaction force) is zero. Specifically, when the current axial force Fer, the angle axial force Fib, and the sensor axial force Fse are not abnormal, the basic reaction force calculating unit 82 distributes the current axial force Fer at 30%, the angle axial force Fib at 45%, and the sensor axial force Fse at 70% and calculates the reaction component Fir. For example, when it is assumed that the value of the sensor axial force Fse is abnormal, the basic reaction force calculating unit 82 distributes the current axial force Fer at 45%, the angle axial force Fib at 60%, and the sensor axial force Fse at 0% and calculates the reaction component Fir. Accordingly, since an influence (contribution) of an abnormal axial force on the value of the reaction component Fir is removed, the target reaction torque Ts* which is calculated using the reaction component Fir can be appropriately prevented from being an abnormal value and application of an abnormal steering reaction force can be appropriately prevented.

When one of the current axial force Fer, the angle axial force Fib, and the sensor axial force Fse is abnormal, the basic reaction force calculating unit 82 increases the contribution proportion of the axial forces other than the abnormal axial force to the reaction component Fir by increasing the distribution gains Ger, Gib, and Gse which are multiplied by the axial forces other than the abnormal axial force. Accordingly, it is possible to prevent the magnitude of the steering reaction force from changing between before and after an abnormality occurs one of the current axial force Fer, the angle axial force Fib, and the sensor axial force Fse and to prevent a driver from feeling uncomfortable.

A controller for a steering device according to a second embodiment will be described below with reference to the accompanying drawings. For the purpose of convenience of explanation, the same elements will be referred to by the same reference signs as in the first embodiment and description thereof will not be repeated.

Figure 4:
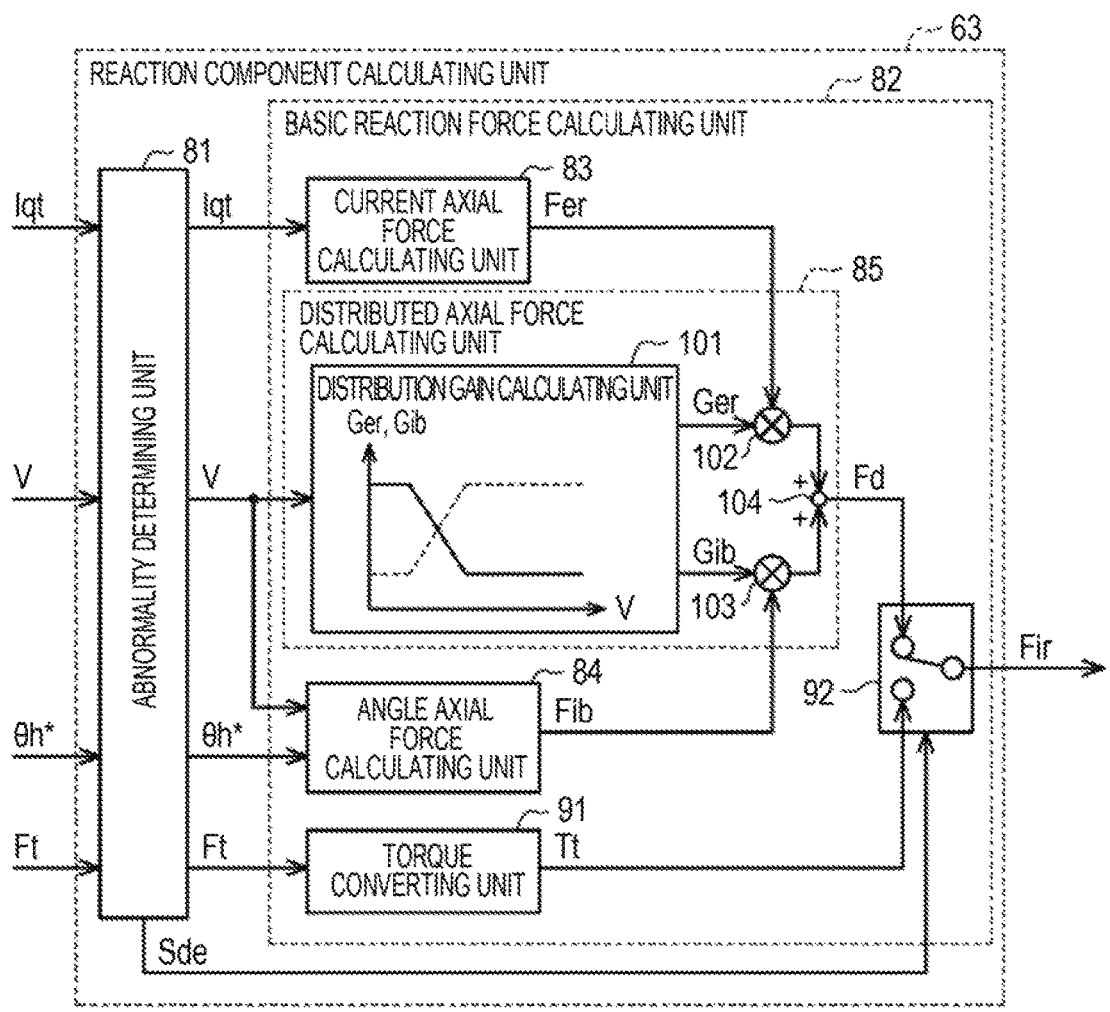
FIG. 4 is a block diagram illustrating a reaction component calculating unit according to a second embodiment.

As illustrated in FIG. 4, a target steering angle θh*, a vehicle speed V, a q-axis current value Iqt, and a tire force Ft are input to a reaction component calculating unit 63 according to this embodiment, and a sensor axial force Fse is not input thereto. The tire force Ft is a value (unit: newton) based on at least one of a load in a vehicle length direction (an x direction), a load in a vehicle width direction (a y direction), a load in a vehicle height direction (a z direction), a moment around an x axis, a moment around a y axis, and a moment of a z axis which are detected by the hub units 42 (see FIG. 1).

The vehicle speed V, the q-axis current value Iqt, the target steering angle θh*, and the tire force Ft are input to the abnormality determining unit 81 according to this embodiment. Similarly to the first embodiment, the abnormality determining unit 81 determines whether each state quantity is abnormal, and outputs the vehicle speed V, the q-axis current value Iqt, the target steering angle θh*, and the tire force Ft which are input thereto along with a determination signal Sde indicating the determination result to the basic reaction force calculating unit 82.

The basic reaction force calculating unit 82 according to this embodiment includes a torque converting unit 91 and an output switching unit 92 in addition to a current axial force calculating unit 83, an angle axial force calculating unit 84, and a distributed axial force calculating unit 85. Similarly to the first embodiment, the current axial force calculating unit 83 and the angle axial force calculating unit 84 calculate a current axial force Fer and an angle axial force Fib, respectively, and output the calculated axial forces to the distributed axial force calculating unit 85.

The distributed axial force calculating unit 85 includes a distribution gain calculating unit 101 that calculates a current distribution gain Ger and an angle distribution gain Gib based on the vehicle speed V. The distribution gain calculating unit 101 according to this embodiment includes a map in which a relationship between the vehicle speed V and the distribution gains Ger and Gib is defined and calculates the distribution gains Ger and Gib based on the vehicle speed V with reference to the map. The current distribution gain Ger has a larger value when the vehicle speed V is high than when the vehicle speed V is low, and the angle distribution gain Gib has a smaller value when the vehicle speed V is high than when the vehicle speed V is low. In this embodiment, the values are set such that the sum of the distribution gains Ger and Gib is "1." The calculated current distribution gain Ger is output to a multiplier 102 and the calculated angle distribution gain Gib is output to a multiplier 103.

The current axial force Fer is input to the multiplier 102, and the angle axial force Fib is input to the multiplier 103. The distributed axial force calculating unit 85 multiplies the current distribution gain Ger by the current axial force Fer using the multiplier 102, multiplies the angle distribution gain Gib by the angle axial force Fib using the multiplier 103, and sums the resultant values using an adder 104 to calculate a distributed axial force Fd. The calculated distributed axial force Fd is output to the output switching unit 92.

The tire force Ft is input to the torque converting unit 91. The torque converting unit 91 calculates a tire torque Tt around the first pinion shaft 21 by multiplying the tire force Ft by a conversion factor Kp based on a rotation speed ratio of the first rack and pinion mechanism 24. The calculated tire torque Tt is output to the output switching unit 92.

A determination signal Sde in addition to the distributed axial force Fd and the tire torque Tt is input to the output switching unit 92. The output switching unit 92 outputs the distributed axial force Fd as a reaction component Fir when it is determined based on the determination signal Sde that the state quantities serving as a basis of the distributed axial force Fd is not abnormal, and outputs the tire torque Tt as the reaction component Fir when at least one of the state quantities is abnormal. That is, the basic reaction force calculating unit 82 according to this embodiment acquires three forces including the current axial force Fer, the angle axial force Fib, and the tire force Ft and outputs the distributed axial force Fd based on the current axial force Fer and the angle axial force Fib or the tire torque Tt based on the tire force Ft as the reaction component Fir. When a state quantity serving as a basis of the distributed axial force Fd is abnormal, the basic reaction force calculating unit 82 decreases the contribution proportion of the abnormal axial force to the reaction component Fir (to zero) and calculates the reaction component Fir, by switching the abnormal state quantity to the tire torque Tt.

In this embodiment, the same operations and advantages as the operations and advantages in the first embodiment are achieved. A controller for a steering device according to a third embodiment will be described below with reference to the accompanying drawings. For the purpose of convenience of explanation, the same elements will be referred to by the same reference signs as in the first embodiment and description thereof will not be repeated.

Figure 5:
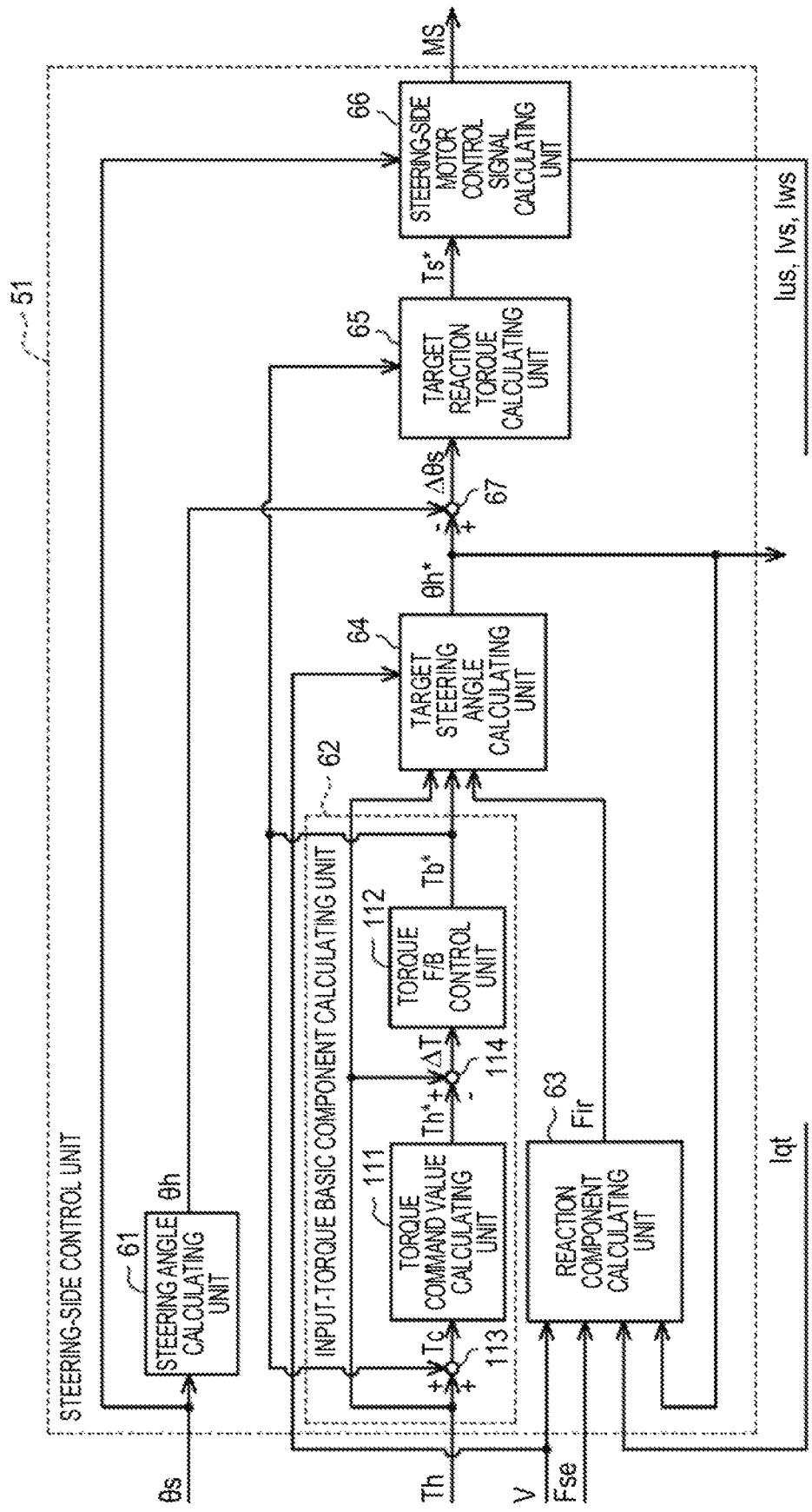
FIG. 5 is a block diagram illustrating a steering-side control unit according to a third embodiment.

As illustrated in FIG. 5, the input-torque basic component calculating unit 62 according to this embodiment includes a torque command value calculating unit 111 that calculates a torque command value Th* which is a target value of a steering torque Th which is to be input by a driver in response to a drive torque Tc and a torque feedback control unit (hereinafter referred to as a torque F/B control unit) 112 that performs a torque feedback operation.

Specifically, a drive torque Tc obtained by adding an input-torque basic component Tb* to the steering torque Th using an adder 113 is input to the torque command value calculating unit 111. The torque command value calculating unit 111 calculates the torque command value Th* having a larger absolute value as the absolute value of the drive torque Tc increases.

A torque deviation ΔT obtained by subtracting the torque command value Th* from the steering torque Th using a subtractor 114 is input to the torque F/B control unit 112. The torque F/B control unit 112 calculates an input-torque basic component Tb* as a control value for feedback controlling the steering torque Th to the torque command value Th* based on the torque deviation ΔT. Specifically, the torque F/B control unit 112 calculates the sum of output values of a proportional element, an integral element, and a differential element with the torque deviation ΔT as an input as the input-torque basic component Tb*.

Similarly to the first embodiment, the calculated input-torque basic component Tb* is output to the target steering angle calculating unit 64 and the target reaction torque calculating unit 65 and is output to the adder 113. Accordingly, similarly to the first embodiment, the target steering angle θh* is calculated by the target steering angle calculating unit 64 and the target reaction torque Ts* is calculated by the target reaction torque calculating unit 65.

In this embodiment, the same operations and advantages as the operations and advantages in the first embodiment are achieved. A controller for a steering device according to a fourth embodiment will be described below with reference to the accompanying drawings. For the purpose of convenience of explanation, the same elements will be referred to by the same reference signs as in the first embodiment and description thereof will not be repeated.

Figure 6:
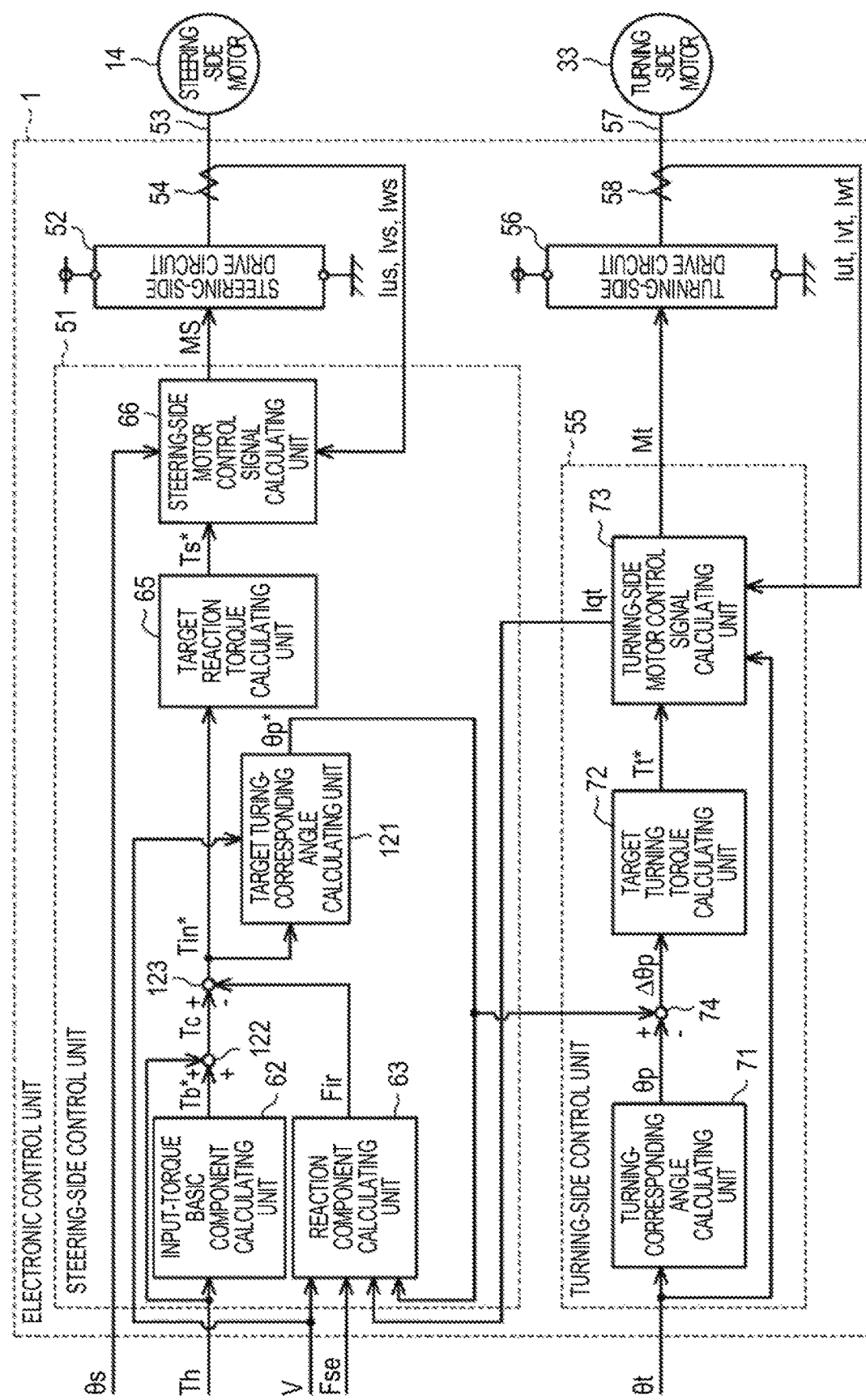
FIG. 6 is a block diagram illustrating a steering control system according to a fourth embodiment.

As illustrated in FIG. 6, the steering-side control unit 51 according to this embodiment includes a target turning-corresponding angle calculating unit 121 that calculates a target turning-corresponding angle θp* which is a target value of a turning-corresponding angle θp which can convert the turning angle of the turning wheels 4 and does not include the target steering angle calculating unit 64.

The steering-side control unit 51 includes an adder 122 to which the input-torque basic component Tb* is input along with the steering torque Th is input, and calculates a drive torque Tc by adding the input values using the adder 122. The steering-side control unit 51 includes a subtractor 243 to which the reaction component Fir along with the drive torque Tc is input and calculates an input torque Tin* by subtracting the reaction component Fir from the drive torque Tc using the subtractor 243. The calculated input torque Tin* is output to the target reaction torque calculating unit 65 and the target turning-corresponding angle calculating unit 121. The target reaction torque calculating unit 65 calculates a target reaction torque Ts* which is a target value of a steering reaction force which is applied by the steering-side motor 14 based on the input torque Tin*. Specifically, the target reaction torque calculating unit 65 calculates the target reaction torque Ts* having a larger absolute value as the input torque Tin* increases.

The input torque Tin* and the vehicle speed V are input to the target turning-corresponding angle calculating unit 121. The target turning-corresponding angle calculating unit 121 calculates the target turning-corresponding angle θp* through the same arithmetic operation process as the arithmetic operation process for calculating the target steering angle θh* in the target steering angle calculating unit 64 according to the first embodiment. The calculated target turning-corresponding angle θp* is the same value as the target steering angle θh* in the first embodiment and is output to the turning-side control unit 55 and the reaction component calculating unit 63.

In this embodiment, the same operations and advantages as the operations and advantages in the first embodiment are achieved. A controller for a steering device according to a fifth embodiment will be described below with reference to the accompanying drawings. For the purpose of convenience of explanation, the same elements will be referred to by the same reference signs as in the fourth embodiment and description thereof will not be repeated.

Figure 7:
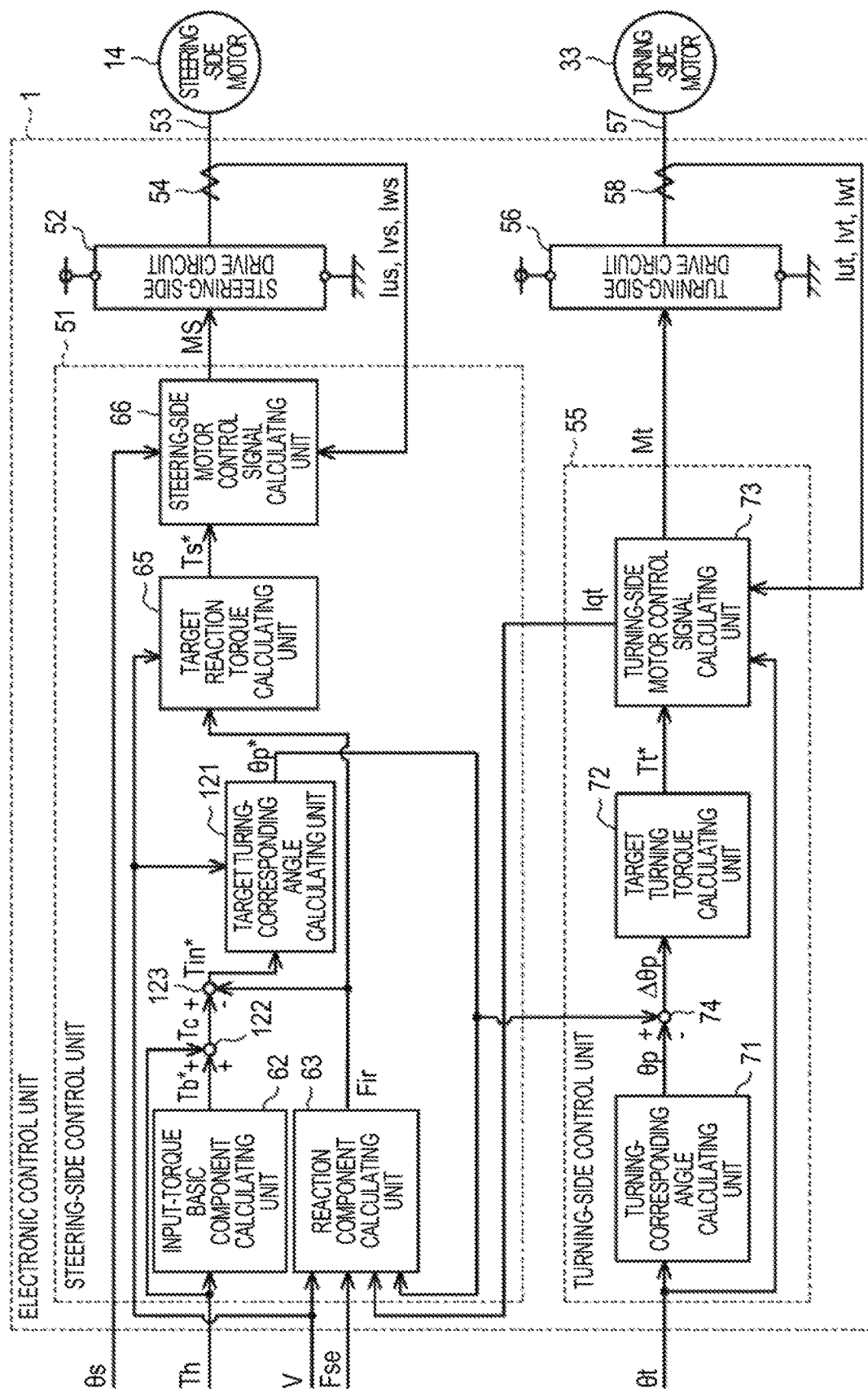
FIG. 7 is a block diagram illustrating a steering control system according to a fifth embodiment.

As illustrated in FIG. 7, the reaction component Fir and the vehicle speed V are input to the target reaction torque calculating unit 65 according to this embodiment. The target reaction torque calculating unit 65 calculates a target reaction torque Ts* having a larger absolute value as the absolute value of the reaction component Fir increases or as the vehicle speed V increases.

In this embodiment, the same operations and advantages as the operations and advantages in the first embodiment are achieved. This embodiment can be modified as follows. This embodiment and the following modified examples can be combined with each other in a technical consistent range.

In the first and third to fifth embodiments, the reaction component Fir is calculated based on the current axial force Fer, the angle axial force Fib, and the sensor axial force Fse, but the disclosure is not limited thereto and the reaction component Fir may be calculated using an axial force which is estimated based on another state quantity in addition to or instead of the axial forces. Examples of the axial force include a vehicle state quantity axial force which is calculated based on a yaw rate and a lateral acceleration and a tire axial force which is calculated based on the tire force Ft. Similarly, in the second embodiment, the distributed axial force Fd may be calculated using another state quantity.

In the second embodiment, the distributed axial force Fd or the tire torque Tt is output as the reaction component Fir according to the result of abnormality determination. However, the configuration of switching the output according to the determination result is not limited thereto. For example, the angle axial force Fib and the current axial force Fer may be input to the output switching unit 92, one of the current axial force Fer and the angle axial force Fib may be output when both state quantities are normal, and the other may be output when the state quantity serving as a basis of the one axial force is abnormal.

In the first and third to fifth embodiments, when one of the current axial force Fer, the angle axial force Fib, and the sensor axial force Fse is abnormal, the distribution gains Ger, Gib, and Gse which are multiplied by the abnormal axial force are set to zero, but the disclosure is not limited thereto and the distribution gains Ger, Gib, and Gse may be set to a value greater than zero as long as it is less than that when there is no abnormality. Accordingly, since an influence of the abnormal axial force on the value of the reaction component Fir decreases, it is possible to prevent the target reaction torque Ts* which is calculated using the reaction component Fir from being an abnormal value.

In the first and third to fifth embodiments, when one of the current axial force Fer, the angle axial force Fib, and the sensor axial force Fse is abnormal, the distribution gains Ger, Gib, and Gse which are multiplied by the axial forces other than the abnormal axial force are increased, but the disclosure is not limited thereto and the distribution gains Ger, Gib, and Gse which are multiplied by the axial forces other than the abnormal axial force may not be changed.

In the above-mentioned embodiments, the abnormality determining unit 81 determines whether the value of each state quantity is abnormal, and determines that an axial force is abnormal when the state quantity for calculating the axial force is abnormal. However, the disclosure is not limited thereto and it may be determined whether an arithmetic operation process (for example, an arithmetic operation process of the current axial force calculating unit 83 of calculating the current axial force Fer based on the q-axis current value Iqt) is abnormal in addition to or instead of the determination, it may be determined whether the axial force is abnormal based on the result of determination. The method of determining whether there is an abnormality can be appropriately changed.

In the above-mentioned embodiments, the current axial force Fer is calculated based on the q-axis current value Iqt, but the disclosure is not limited thereto and the current axial force Fer may be calculated, for example, based on the q-axis target current value Iqt*. In the above-mentioned embodiments, the angle axial force Fib is calculated based on the target steering angle θh* (the turning-corresponding angle) and the vehicle speed V, but the disclosure is not limited thereto and the angle axial force Fib may be calculated based on only the target steering angle θh* (the turning-corresponding angle). Without being limited to the target steering angle θh*, the angle axial force Fib may be calculated based on the steering angle θh or the turning-corresponding angle θp. For example, the angle axial force Fib may be calculated using another method of considering another parameter such as the steering torque Th or the vehicle speed V.

In the second embodiment, the distributed axial force calculating unit 85 may calculate the distribution gains Ger and Gib in consideration of a parameter other than the vehicle speed V. For example, in a vehicle in which a drive mode indicating a set state of a control pattern of an onboard engine or the like can be selected out of a plurality of drive modes, the selected drive mode may be used as a parameter for setting the distribution gains Ger and Gib. In this case, a configuration in which the distributed axial force calculating unit 85 includes a plurality of maps having different tendencies for the vehicle speed V depending on drive modes and the distribution gains Ger and Gib are calculated with reference to the maps can be employed.

In the fourth and fifth embodiments, the target turning-corresponding angle θp* is calculated based on the input torque Tin*, but the disclosure is not limited thereto and the target turning-corresponding angle θp* may be calculated based on another parameter such as the steering angle θh.

In the above-mentioned embodiments, the reaction component calculating unit 63 may calculate a value in which a reaction force other than the distributed axial force Fd or the tire torque Tt is reflected as the reaction component Fir. For example, an end reaction force which is a reaction force resisting further return steering may be employed as such a reaction force when the absolute value of the steering angle θh of the steering wheel 11 approaches a steering angle threshold value. For example, the turning-corresponding angle θp at a virtual rack end position which is set to be closer to a neutral position than a mechanical rack end position at which movement in the axial direction of the rack shaft 22 is regulated by causing the rack end 25 to come in contact with the rack housing 23 can be used as the steering angle threshold value. The steering angle θh at a rotation end position of the steering wheel 11 may be used as the steering angle threshold value.

In the above-mentioned embodiments, the steering angle ratio between the steering angle θh and the turning-corresponding angle θp is set to be constant, but the disclosure is not limited thereto and the steering angle ratio may be set to vary depending on a vehicle speed or the like. In this case, the target steering angle θh* and the target turning-corresponding angle θp* have different values.

In the above-mentioned embodiments, the target steering angle calculating unit 64 may calculate the target steering angle θh* using a model formula to which a so-called spring term is added using a spring constant K which is determined based on specifications of suspension, wheel alignment, and the like.

In the first to third embodiments, the target reaction torque calculating unit 65 calculates the target reaction torque Ts* by adding an input-torque basic component Tb* to a basic reaction torque, but the disclosure is not limited thereto. For example, the basic reaction torque may be calculated as the target reaction torque Ts* without adding the input-torque basic component Tb* thereto.

In the above-mentioned embodiments, the rack shaft 22 may be supported, for example, by a bush instead of the first rack and pinion mechanism 24. In the above-mentioned embodiments, for example, a structure in which the turning-side motor 33 is disposed to be coaxial with the rack shaft 22 or a structure in which the turning-side motor 33 is disposed to be parallel to the rack shaft 22 may be employed by the turning-side actuator 31.

In the above-mentioned embodiments, the steering device 2 which is a control object of the electronic control unit 1 is a linkless steer-by-wire steering device in which the steering unit 3 and the turning unit 5 are mechanically separated from each other, but the disclosure is not limited thereto and a steer-by-wire steering device in which the steering unit 3 and the turning unit 5 can be mechanically disconnected and connected by a clutch may be used.

Figure 8:
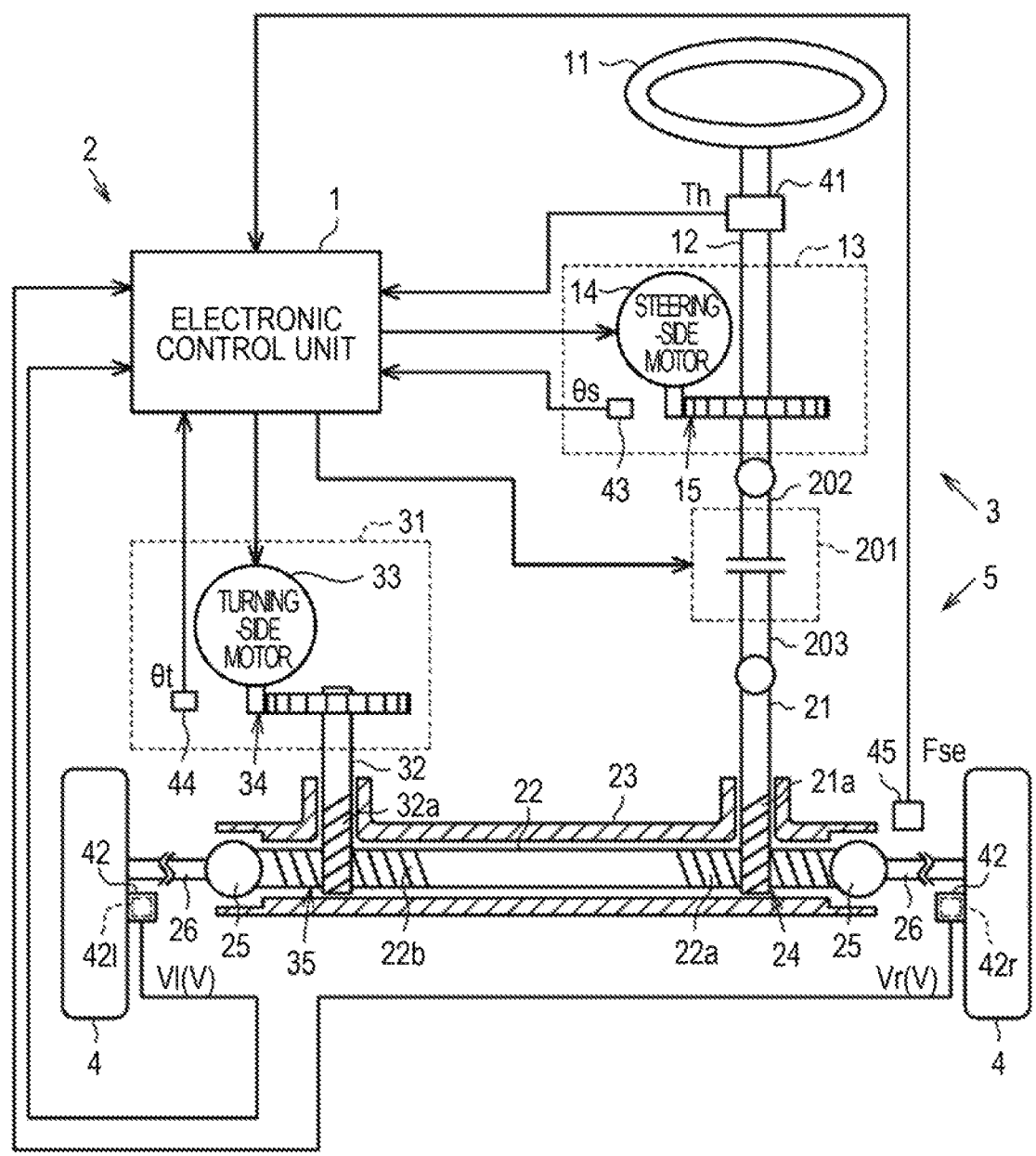
FIG. 8 is a diagram schematically illustrating a configuration of a steer-by-wire steering device according to a modified example.

For example, in the example illustrated in FIG. 8, a clutch 201 is provided between the steering unit 3 and the turning unit 5. The clutch 201 is connected to the steering shaft 12 via an input-side intermediate shaft 202 fixed to an input-side element thereof and is connected to the first pinion shaft 21 via an output-side intermediate shaft 203 fixed to an output-side element thereof. When the clutch 201 is switched to a disconnected state in response to a control signal from the electronic control unit 1, the steering device 2 is switched to a steer-by-wire mode. When the clutch 201 is switched to a connected state, the steering device 2 is switched to an electric power steering mode.

Technical spirits which can be understood from the embodiments and the modified examples will be supplemented below: A controller for a steering device in which the basic reaction force calculating unit calculates a distributed axial force which is obtained by adding the axial forces of a plurality of types at distribution proportions which are individually set or the tire force as the basic reaction force.

Figure 9:
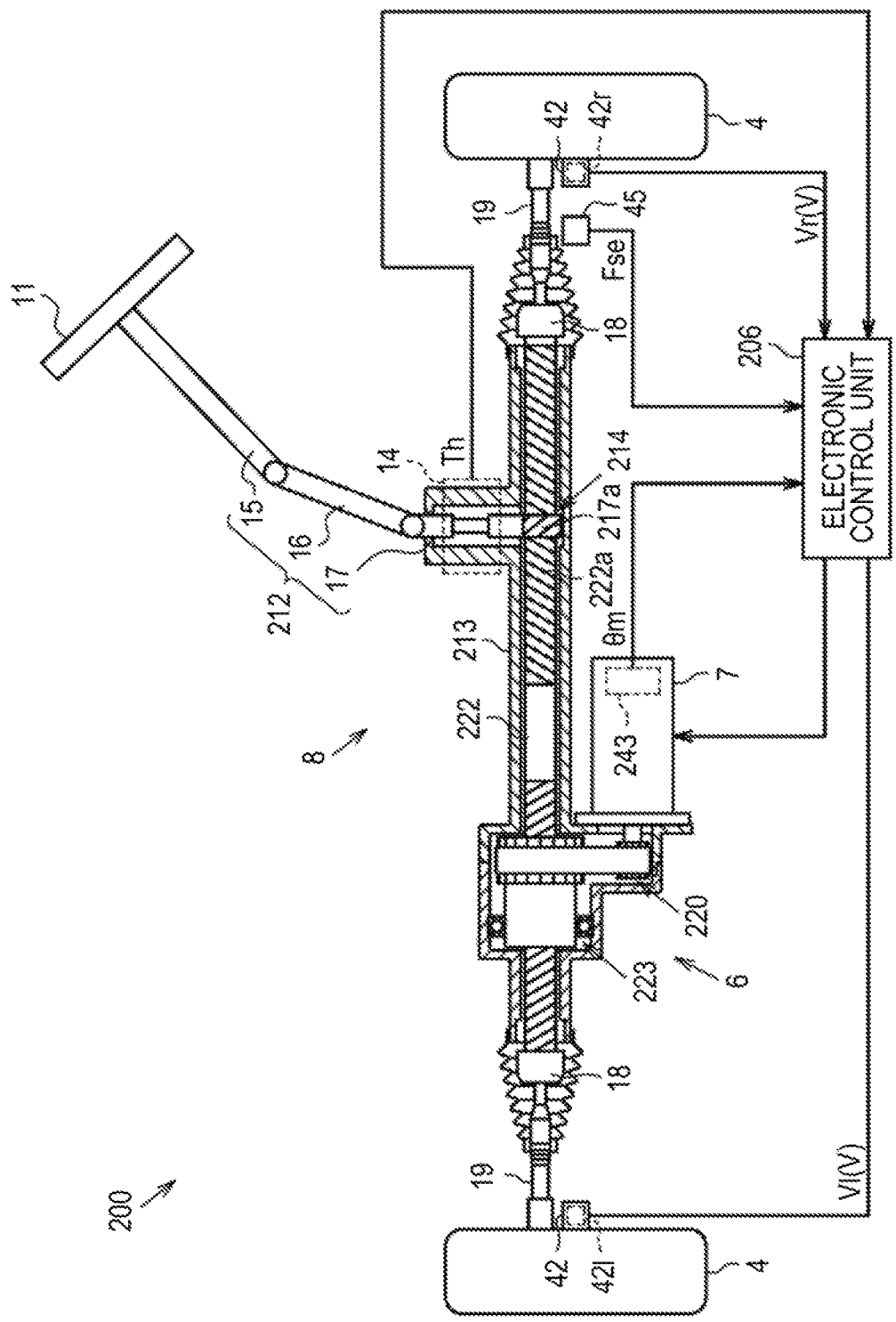
FIG. 9 is a diagram schematically illustrating a configuration of an electric power steering device according to a sixth embodiment.

Hereinafter, a controller for a steering device according to a sixth embodiment will be described below with reference to the accompanying drawings. For the purpose of convenience of explanation, the same elements will be referred to by the same reference signs as in the first embodiment. As illustrated in FIG. 9, an electric power steering device (EPS) 200 which is a steering device serving as a control object includes a steering mechanism 8 that turns turning wheels 4 based on a driver's operation of a steering wheel 11. The EPS 200 includes an assist mechanism 6 that applies an assist force for assisting a steering operation to the steering mechanism 8 and an electronic control unit 206 that controls operation of the assist mechanism 6.

The steering mechanism 8 includes a steering shaft 212 to which the steering wheel 11 is fixed, a rack shaft 222 that serves as a turning shaft connected to the steering shaft 212, a cylindrical rack housing 213 into which the rack shaft 222 is movably inserted, and a rack and pinion mechanism 214 that converts a rotational motion of the steering shaft 212 to a translational motion of the rack shaft 222. The steering shaft 212 is configured to connecting a column shaft 215, an intermediate shaft 216, and a pinion shaft 217 sequentially from the side on which the steering wheel 11 is located.

The rack shaft 222 and the pinion shaft 217 are disposed in the rack housing 213 to have a predetermined crossing angle. The rack and pinion mechanism 214 is configured by causing rack teeth 222a formed in the rack shaft 222 and pinion teeth 217a formed in the pinion shaft 217 to engage with each other. Tie rods 19 are connected to both ends of the rack shaft 222 via rack ends 18 formed of ball joints provided at axial ends thereof. The tips of the tie rods 19 are connected to knuckles (not illustrated) which are assembled to the turning wheels 4. Accordingly, in the EPS 200, rotation of the steering shaft 212 due to a steering operation is converted into movement in the axial direction of the rack shaft 222 by the rack and pinion mechanism 214, and the movement in the axial direction is transmitted to the knuckles via the tie rods 19, whereby the turning angle of the turning wheels 4, that is, the traveling direction of a vehicle, is changed.

The assist mechanism 6 includes a motor 7 that serves as a drive source, a transmission mechanism 220 that transmits rotation of the motor 7, and a conversion mechanism 223 that converts the rotation transmitted via the transmission mechanism 220 into linear movement in the axial direction of the rack shaft 222. The assist mechanism 6 transmits rotation of the motor 7 to the conversion mechanism 223 via the transmission mechanism 220 and the conversion mechanism 223 converts the rotation into linear movement of the rack shaft 222, whereby an assist force is applied to the steering mechanism 8. For example, a three-phase brushless motor is employed as the motor 7 according to this embodiment, for example, a belt mechanism is employed as the transmission mechanism 220, and, for example, a ball screw mechanism is employed by the conversion mechanism 223.

A torque sensor 41 that detects a steering torque Th which is applied to the steering shaft 212 by a driver's steering is connected to the electronic control unit 206. A left front-wheel sensor 42l and a right front-wheel sensor 42r that are provided respectively in hub units 42 that rotatably support the turning wheels 4 via a driver shaft (not illustrated) are connected to the electronic control unit 206. The left front-wheel sensor 42l and the right front-wheel sensor 42r detect wheel speeds Vl and Vr of the turning wheels 4, respectively. The electronic control unit 206 according to this embodiment detects a mean value of the wheel speeds Vl and Vr as a vehicle speed V. A rotation sensor 43 that detects a motor angle $\theta m$ of the motor 7 in a relative angle in a range of 360° is connected to the electronic control unit 206. The steering torque Th and the motor angles $\theta m$ are detected as being positive values when the steering wheel is steered in one direction (rightwards in this embodiment) and as being negative values when the steering wheel is steered in the other direction (leftwards in this embodiment). An axial force sensor 45 that acquires a sensor axial force Fse which is a detection value of an axial force applied to the rack shaft 222 is also connected to the electronic control unit 206. For example, a sensor that detects an axial force based on change of a pressure according to a stroke of the rack shaft 222 can be employed as the axial force sensor 45. The electronic control unit 206 acquires the sensor axial force Fse in the dimension of a torque (N·m). The electronic control unit 206 controls operation of the assist mechanism 6, that is, an assist force that is applied to the steering mechanism 8 to allow the rack shaft 222 to move linearly, by supplying a drive power to the motor 7 based on state quantities which are input from the sensors.

Figure 10:
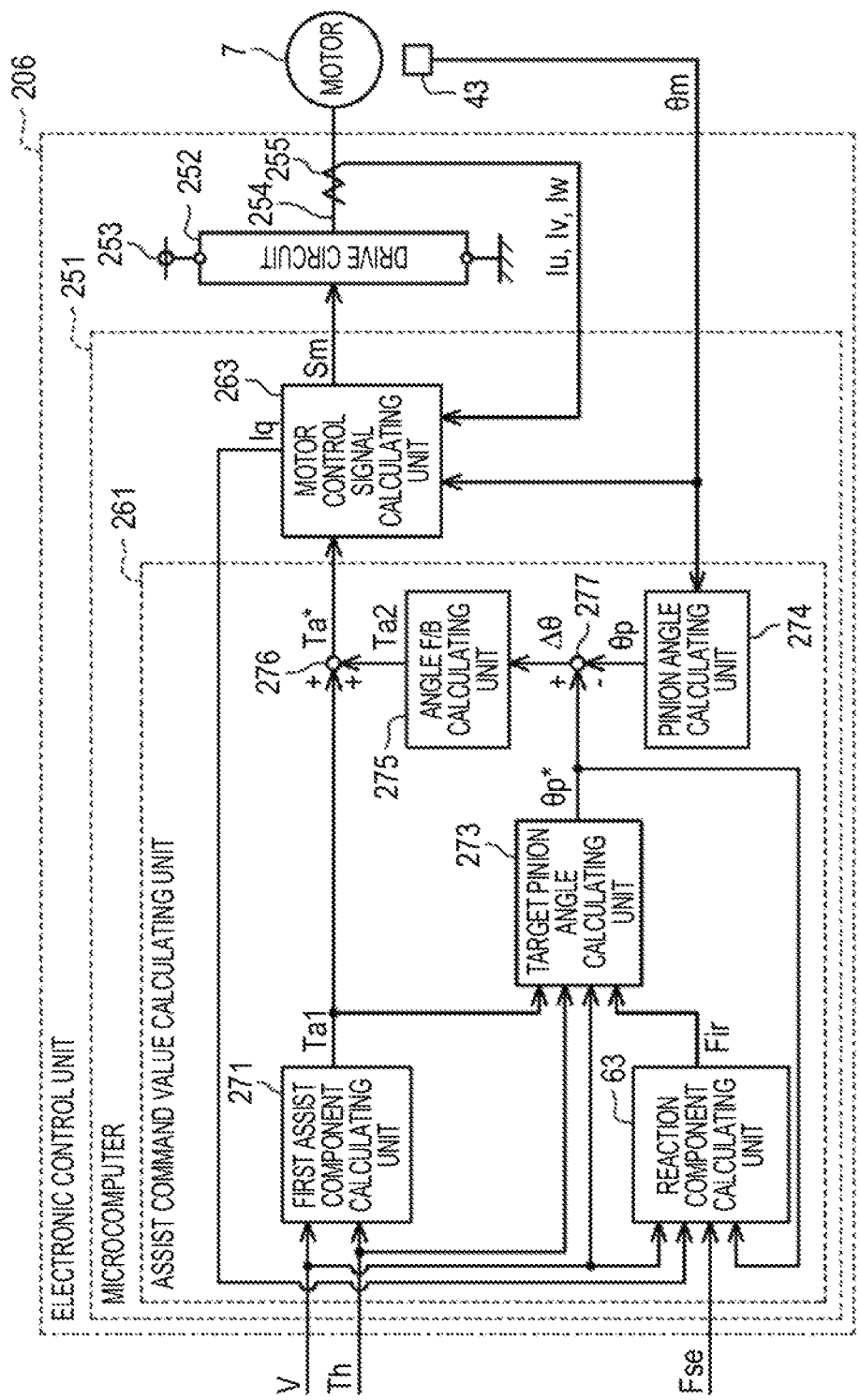
FIG. 10 is a block diagram illustrating a steering control system according to a sixth embodiment.

The configuration of the electronic control unit 206 will be described below. As illustrated in FIG. 10, the electronic control unit 206 includes a microcomputer 251 that outputs a motor control signal Sm and a drive circuit 252 that supplies a drive power to the motor 7 based on the motor control signal Sm. A known PWM inverter including a plurality of switching elements (for example, FETs) is employed as the drive circuit 252 according to this embodiment. The motor control signal Sm output from the microcomputer 251 defines ON/OFF states of the switching elements. Accordingly, the switching elements are turned on and off in response to the motor control signal Sm and power supply patterns to motor coils of phases are switched, whereby a DC power of an onboard power supply 253 is converted into three-phase drive powers which are output to the motor 7. The following control blocks are embodied by a computer program which is executed by the microcomputer 251, state quantities are detected in a predetermined sampling cycle (a detection cycle), and arithmetic operation processes represented by the control blocks are performed in a predetermined operation cycle.

The vehicle speed V, the steering torque Th, the motor angle $\theta m$, and the sensor axial force Fse are input to the microcomputer 251. Phase current values Iu, Iv, and Iw of the motor 7 which are detected by a current sensor 255 provided in connection lines 254 between the drive circuit 252 and the motor coils of phases are input to the microcomputer 251. In FIG. 10, for the purpose of convenience of explanation, the connection lines 254 of phases and the current sensors 255 of phases are collectively illustrated as being single. The microcomputer 251 outputs the motor control signal Sm based on these state quantities.

Specifically, the microcomputer 251 includes an assist command value calculating unit 261 that calculates an assist command value Ta* and a motor control signal calculating unit 263 that calculates the motor control signal Sm. As will be described later, the assist command value calculating unit 261 calculates the assist command value Ta* corresponding to an assist force which is to be applied by the steering mechanism 8 based on an added value of a first assist component Ta1 based on the steering torque Th and a second assist component Ta2 based on execution of angle feedback control for causing a pinion angle θp to follow a target pinion angle θp*.

The motor control signal calculating unit 263 calculates target current values Id* and Iq* which are target values of a drive current which is supplied to the motor 7 based on the assist command value Ta*. The target current values Id* and Iq* represent a target current value on the d axis and a target current value on the q axis in the d/q coordinate system, respectively. The motor control signal calculating unit 263 calculates the q-axis target current value Iq* having a larger absolute value as the absolute value of the assist command value Ta* increases. The d-axis target current value Id* is basically set to zero. The motor control signal calculating unit 263 generates a control signal by executing current feedback control in the d/q coordinate system based on the target current values Id* and Iq*, the phase current values Iu, Iv, and Iw, and the motor angle θm of the motor 7.

Specifically, the motor control signal calculating unit 263 calculates a d-axis current value Id and a q-axis current value Iq which are actual current values of the motor 7 in the d/q coordinate system by mapping the phase current values Iu, Iv, and Iw onto the d/q coordinates based on the motor angle θm. Then, the motor control signal calculating unit 263 calculates a target voltage value based on the current deviations between the d axis and the q axis such that the d-axis current value Id follows the d-axis target current value Id* and such that the q-axis current value Iq follows the q-axis target current value Iq*, and generates the motor control signal Sm having a duty ratio based on the target voltage value. The q-axis current value Iq calculated in the course of generating the motor control signal Sm is output to the assist command value calculating unit 261.

The calculated motor control signal Sm is output to the drive circuit 252. Accordingly, the motor 7 is supplied with a drive power based on the motor control signal Sm from the drive circuit 252. The motor 7 applies an assist force indicated by the assist command value Ta* to the steering mechanism 8.

The configuration of the assist command value calculating unit 261 will be described below. The steering torque Th, the vehicle speed V, the motor angle θm, the sensor axial force Fse, and the q-axis current value iq are input to the assist command value calculating unit 261. The assist command value calculating unit 261 calculates the assist command value Ta* based on these state quantities.

Specifically, the assist command value calculating unit 261 includes a first assist component calculating unit 271 that calculates a first assist component Ta1, a reaction component calculating unit 63 that calculates a reaction component Fir, a target pinion angle calculating unit 273 that calculates a target pinion angle θp*, and a pinion angle calculating unit 274 that calculates a pinion angle θp. The assist command value calculating unit 261 includes an angle feedback control unit (hereinafter referred to as an angle F/B control unit) 275 that calculates a second assist component Ta2 by executing angle feedback control for causing an actual pinion angle θp to follow the target pinion angle θp*.

The assist command value calculating unit 261 calculates the assist command value Ta* based on the first assist component Ta1 and the second assist component Ta2.

More specifically, the steering torque Th and the vehicle speed V are input to the first assist component calculating unit 271. The first assist component calculating unit 271 calculates the first assist component Ta1 which is a force for assisting a steering operation based on the state quantities. Specifically, the first assist component calculating unit 271 calculates the first assist component Ta1 having a larger absolute value as the absolute value of the steering torque Th increases and the vehicle speed V decreases. The calculated first assist component Ta1 is output to the target pinion angle calculating unit 273 and an adder 276.

The steering torque Th, the vehicle speed V, the sensor axial force Fse, and the target pinion angle θp* are input to the reaction component calculating unit 63. As will be described later, the reaction component calculating unit 63 calculates a reaction component Fir which is a force for resisting the steering operation based on the state quantities and outputs the calculated reaction component Fir to the target pinion angle calculating unit 273.

The steering torque Th, the vehicle speed V, the first assist component Ta1, and the reaction component Fir are input to the target pinion angle calculating unit 273. The target pinion angle calculating unit 273 calculates the target pinion angle θp* as a target rotation angle of the pinion shaft 217 which is a rotation shaft which can convert a turning angle of the turning wheels 4 based on the state quantities. Specifically, the target pinion angle calculating unit 273 calculates a target pinion angle θp* using a model (steering model) formula in which the target pinion angle θp* is correlated with an input torque Tin* which is obtained by adding the steering torque Th to the first assist component Ta1 and subtracting the reaction component Fir therefrom.

$$Tin^* = C \cdot \theta p^{*\prime} + J \cdot \theta p^{*\prime\prime} \qquad (2)$$

This model formula defines and represents a relationship between a torque of a rotation shaft rotating with rotation of the steering wheel 11 and the rotation angle of the rotation shaft. This model formula is expressed using a stickiness coefficient C modeling friction or the like of the EPS 200 and an inertia coefficient J modeling the inertia of the EPS 200. The stickiness coefficient C and the inertia coefficient J are set to vary depending on the vehicle speed V. The target pinion angle θp* which is calculated using the model formula is output to a subtractor 277 and the reaction component calculating unit 63.

A motor angle θm is input to the pinion angle calculating unit 274. The pinion angle calculating unit 274 calculates a pinion angle θp indicating a rotation angle (a steering angle) of the pinion shaft 217 based on the motor angle θm. Specifically, the pinion angle calculating unit 274 integrates (counts) the number of turns of the motor 7, for example, when the pinion angle θp in a state in which the rack shaft 222 is located at a neutral position at which the vehicle travels forward as an origin (zero degrees) and calculates the pinion angle θp in an absolute angle in a range greater than 360° based on the number of turns and the motor angle θm. The calculated pinion angle θp is output to the subtractor 277.

An angle deviation Δθ obtained by causing the subtractor 277 to subtract the pinion angle θp from the target pinion angle θp* is input to the angle F/B control unit 275. Then, the angle F/B control unit 275 calculates a second assist component Ta2 which is a force for assisting the steering operation as a control value for feedback controlling the pinion angle θp to the target pinion angle θp* based on the angle deviation Δθ. Specifically, the angle F/B control unit 275 calculates the sum of output values of a proportional element, an integral element, and a differential element with the angle deviation Δθ as an input as the basic reaction torque. The calculated second assist component Ta2 is output to an adder 276.

The assist command value calculating unit 261 calculates a value obtained by causing the adder 276 to add the second assist component Ta2 to the first assist component Ta1 as the assist command value Ta* and outputs the assist command value Ta* to the motor control signal calculating unit 263.

The configuration of the reaction component calculating unit 63 will be described below. The vehicle speed V, the sensor axial force Fse, the q-axis current value Iq, and the target pinion angle θp* are input to the reaction component calculating unit 63. The reaction component calculating unit 63 calculates a reaction component Fir corresponding to an axial force acting on the rack shaft 222 based on these state quantities and outputs the calculated reaction component Fir to the target pinion angle calculating unit 273.

Figure 11:
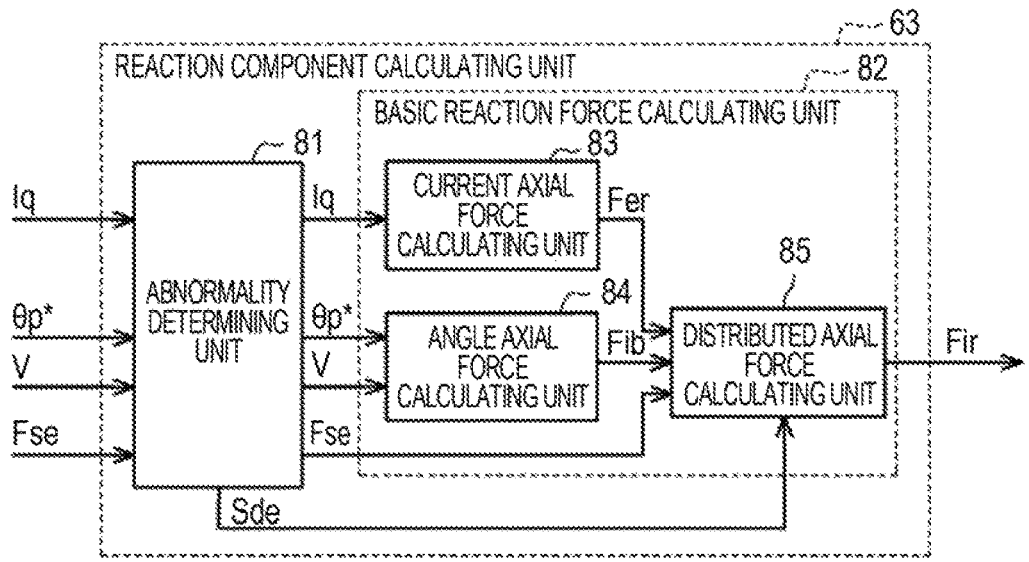
FIG. 11 is a block diagram illustrating a reaction component calculating unit according to a sixth embodiment.

As illustrated in FIG. 11, the reaction component calculating unit 63 includes an abnormality determining unit 81 that determines whether an input state quantity (signal) is abnormal and a basic reaction force calculating unit 82 that calculates a base reaction force which is the reaction force component Fir based on the state quantities.

The vehicle speed V, the sensor axial force Fse, the q-axis current value Iq, and the target pinion angle θp* are input to the abnormality determining unit 81. The abnormality determining unit 81 determines whether each input state quantity is abnormal using a method of determining that there is an abnormality, for example, when the state quantity has an impossible value or when a change from a previous value is greater than a predetermined threshold value. Then, the abnormality determining unit 81 outputs the vehicle speed V, the sensor axial force Fse, the q-axis current value Iq, and the target pinion angle θp* which have been input thereto in addition to a determination signal Sde indicating a result of abnormality determination to the basic reaction force calculating unit 82.

The basic reaction force calculating unit 82 includes a current axial force calculating unit 83 that calculates a current axial force (road-surface axial force) Fer and an angle axial force calculating unit 84 that calculates an angle axial force (ideal axial force) Fib. The current axial force Fer and the angle axial force Fib are calculated in the dimension of a torque (N·m). The basic reaction force calculating unit 82 includes a distributed axial force calculating unit 85 that calculates a distributed axial force which is obtained by distributing the current axial force Fer, the angle axial force Fib, and the sensor axial force Fse at predetermined proportions as a reaction component Fir (a basic reaction force) such that an axial force which is applied to the turning wheels 4 from a road surface (road surface information which is transmitted from the road surface) is reflected therein.

The q-axis current value Iq is input to the current axial force calculating unit 83. The current axial force calculating unit 83 calculates the current axial force Fer which is an estimated value of the axial force which is applied to the turning wheels 4 (a force which is transmitted to the turning wheels 4) and in which road surface information is reflected based on the q-axis current value Iq. Specifically, the current axial force calculating unit 83 calculates the current axial force Fer such that the absolute value thereof increases as the absolute value of the q-axis current value Iq increases in a state in which the torque and the steering torque Th applied to the rack shaft 222 from the motor 7 and the torque corresponding to the force which is applied to the turning wheels 4 from the road surface are balanced with each other. The calculated current axial force Fer is output to the distributed axial force calculating unit 85.

The target pinion angle θp* and the vehicle speed V are input to the angle axial force calculating unit 84. The angle axial force calculating unit 84 calculates the angle axial force Fib which is an ideal value of the axial force which is applied to the turning wheels 4 (a force which is transmitted to the turning wheels 4) and in which road surface information is not reflected based on the target pinion angle θp*. Specifically, the angle axial force calculating unit 84 calculates the angle axial force Fib such that the absolute value thereof increases as the absolute value of the target pinion angle θp* increases. The angle axial force calculating unit 84 calculates the angle axial force Fib such that the absolute value thereof increases as the vehicle speed V increases. The calculated angle axial force Fib is output to the distributed axial force calculating unit 85.

The sensor axial force Fse in addition to the determination signal Sde, the current axial force Fer, and the angle axial force Fib are input to the distributed axial force calculating unit 85. In the distributed axial force calculating unit 85, a current distribution gain Ger indicating a distribution proportion of the current axial force Fer, an angle distribution gain Gib indicating a distribution proportion of the angle axial force Fib, and a sensor distribution gain Gse indicating a distribution proportion of the sensor axial force Fse are set in advance by experiment or the like. The current distribution gain Ger, the angle distribution gain Gib, and the sensor distribution gain Ges are set to vary depending on the vehicle speed V. Then, the distributed axial force calculating unit 85 calculates the reaction component Fir by totally summing a value obtained by multiplying the angle axial force Fib by the angle distribution gain Gib, a value obtained by multiplying the current axial force Fer by the current distribution gain Ger, and a value obtained by multiplying the sensor axial force Fse by the sensor distribution gain Gse. That is, the basic reaction force calculating unit 82 in this embodiment acquires three axial forces including the current axial force Fer, the angle axial force Fib, and the sensor axial force Fse and calculates the reaction component Fir (the basic reaction force) based on the three axial forces.

In the electronic control unit 206 having the above-mentioned configuration, the reaction component Fir (an axial force) is added to the input torque Tin* to calculate the target pinion angle θp*, and the second assist component Ta2 for causing the pinion angle θp to follow the target pinion angle θp* is included in the assist command value Ta*. Accordingly, it is possible to adjust a road-surface reaction force which is transmitted to the steering wheel 11 by changing the second assist component Ta2 (the assist command value Ta*) depending on a road surface state, to deliver road surface information to a driver, and to improve a feeling of steering by suppression vibration or the like. However, for example, when an abnormality occurs in the axial force sensor 45, there is concern of the assist command value Ta* in addition to the reaction component Fir based on the sensor axial force Fse becoming abnormal.

In this regard, in this embodiment, the distribution gains Ger, Gib, and Gse are set to different values depending on the determination result indicated by the determination signal Sde. Specifically, when an acquired state quantity is abnormal, a distribution gain which is multiplied by an axial force based on the abnormal state quantity is set to decrease in comparison with a case in which there is no abnormality and distribution gains which are multiplied by axial forces based on normal quantities are set to increase in comparison with a case in which there is no abnormality. That is, the basic reaction force calculating unit 82 in this embodiment determines that an axial force is abnormal when a state quantity for calculating the axial force is abnormal. The distribution gains Ger, Gib, and Gse are set such that a contribution proportion of an axial force based on an abnormal state quantity (an abnormal axial force) to the reaction component Fir decreases and a contribution proportion of axial forces based on normal state quantities (normal axial forces) to the reaction component Fir increases.

For example, the current distribution gain Ger is set to "0.3" when the state quantities are normal, "0" when the q-axis current value Iq is abnormal, and "0.45" when a state quantity (at least one of the target pinion angle $\theta p^*$, the vehicle speed V, and the sensor axial force Fse) other than the q-axis current value Iq is abnormal. The angle distribution gain Gib is set to "0.45" when the state quantities are normal, "0" when at least one of the target pinion angle $\theta p^*$ and the vehicle speed V is abnormal, and "0.6" when a state quantity (at least one of the q-axis current value Iq and the sensor axial force Fse) other than the target pinion angle $\theta p^*$ and the vehicle speed V is abnormal. The sensor distribution gain Gse is set to "0.7" when the state quantities are normal, "0" when the sensor axial force Fse is abnormal, and "0.9" when a state quantity (at least one of the target pinion angle $\theta p^*$, the vehicle speed V, and the q-axis current value Iq) other than the sensor axial force Fse is abnormal. The values of the distribution gains Ger, Gib, and Gse can vary appropriately and may be set such that the sum thereof becomes "1" or may be set such that the sum thereof is greater or less than "1."

Operations and advantages of this embodiment will be described below. When one of the current axial force Fer, the angle axial force Fib, and the sensor axial force Fse is abnormal, the basic reaction force calculating unit 82 sets the distribution gain Ger, Gib, or Gse which is multiplied by the abnormal axial force to zero, whereby the contribution proportion of the abnormal axial force to the reaction component Fir (the basic reaction force) is zero. Specifically, when the current axial force Fer, the angle axial force Fib, and the sensor axial force Fse are not abnormal, the basic reaction force calculating unit 82 distributes the current axial force Fer at 30%, the angle axial force Fib at 45%, and the sensor axial force Fse at 70% and calculates the reaction component Fir. For example, when it is assumed that the value of the sensor axial force Fse is abnormal, the basic reaction force calculating unit 82 distributes the current axial force Fer at 45%, the angle axial force Fib at 60%, and the sensor axial force Fse at 0% and calculates the reaction component Fir. Accordingly, since an influence (contribution) of an abnormal axial force on the value of the reaction component Fir is removed, the assist command value Ta* can be appropriately prevented from being an abnormal value. Accordingly, even by adjusting the road-surface reaction force which is transmitted to the steering wheel 11 by changing the assist command value Ta*, it is possible to appropriately prevent the road-surface reaction force from being inappropriately adjusted.

When one of the current axial force Fer, the angle axial force Fib, and the sensor axial force Fse is abnormal, the basic reaction force calculating unit 82 increases the contribution proportion of the axial forces other than the abnormal axial force to the reaction component Fir by increasing the distribution gains Ger, Gib, and Gse which are multiplied by the axial forces other than the abnormal axial force. Accordingly, it is possible to prevent the magnitude of the steering reaction force from changing between before and after an abnormality occurs one of the current axial force Fer, the angle axial force Fib, and the sensor axial force Fse and to prevent a driver from feeling uncomfortable.

A controller for a steering device according to a seventh embodiment will be described below with reference to the accompanying drawings. For the purpose of convenience of explanation, the same elements will be referred to by the same reference signs as in the sixth embodiment and description thereof will not be repeated.

Figure 12:
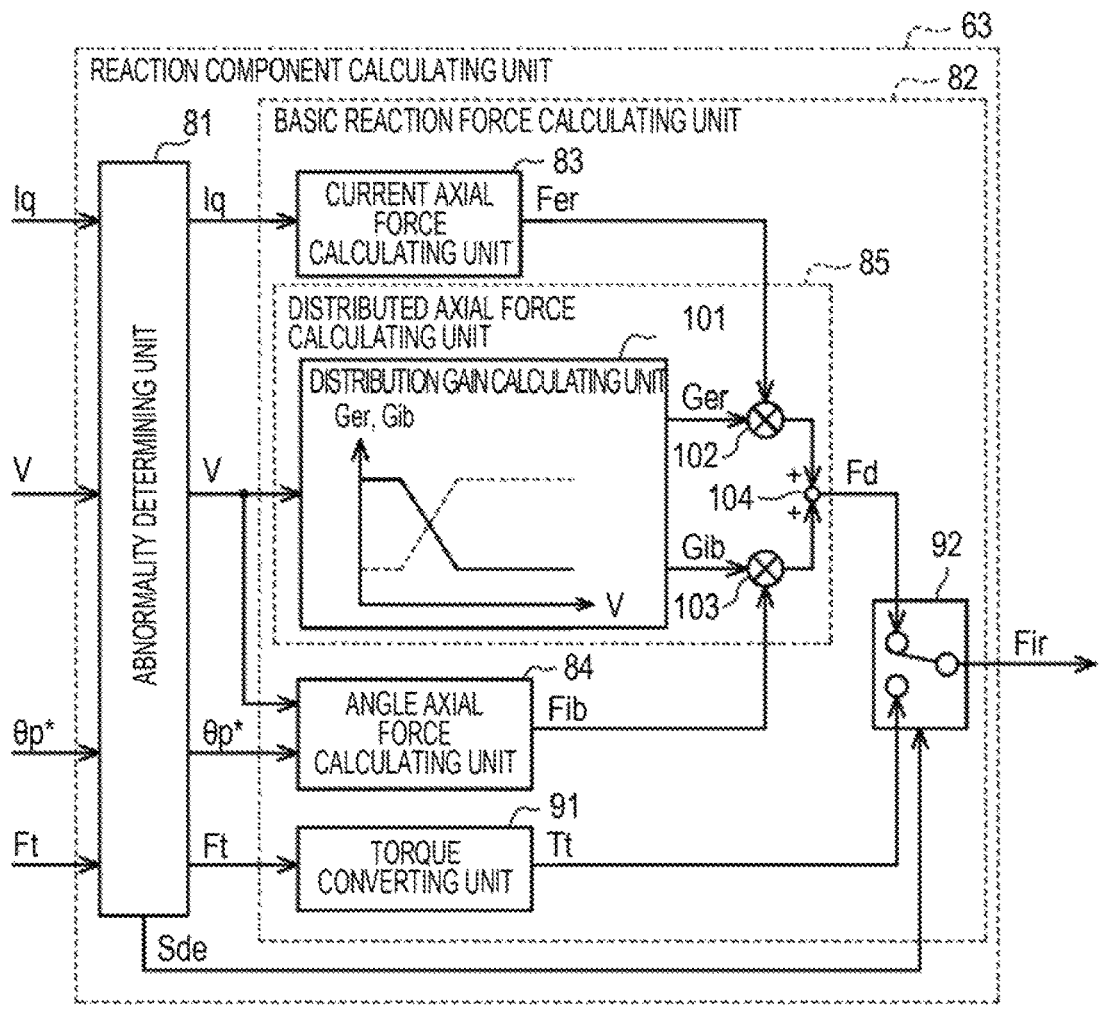
FIG. 12 is a block diagram illustrating a reaction component calculating unit according to a seventh embodiment.

As illustrated in FIG. 12, a target pinion angle $\theta p^*$, a vehicle speed V, a q-axis current value Iq, and a tire force Ft are input to a reaction component calculating unit 63 according to this embodiment, and a sensor axial force Fse is not input thereto. The tire force Ft is a value (unit: newton) based on at least one of a load in a vehicle length direction (an x direction), a load in a vehicle width direction (a y direction), a load in a vehicle height direction (a z direction), a moment around an x axis, a moment around a y axis, and a moment of a z axis which are detected by the hub units 42 (see FIG. 9).

The vehicle speed V, the q-axis current value Iq, the target pinion angle $\theta p^*$, and the tire force Ft are input to the abnormality determining unit 81 according to this embodiment. Similarly to the sixth embodiment, the abnormality determining unit 81 determines whether each state quantity is abnormal, and outputs the vehicle speed V, the q-axis current value Iq, the target pinion angle $\theta p^*$, and the tire force Ft which are input thereto along with a determination signal Sde indicating the determination result to the basic reaction force calculating unit 82.

The basic reaction force calculating unit 82 according to this embodiment includes a torque converting unit 91 and an output switching unit 92 in addition to a current axial force calculating unit 83, an angle axial force calculating unit 84, and a distributed axial force calculating unit 85. Similarly to the sixth embodiment, the current axial force calculating unit 83 and the angle axial force calculating unit 84 calculate a current axial force Fer and an angle axial force Fib, respectively, and output the calculated axial forces to the distributed axial force calculating unit 85.

The distributed axial force calculating unit 85 includes a distribution gain calculating unit 101 that calculates a current distribution gain Ger and an angle distribution gain Gib based on the vehicle speed V. The distribution gain calculating unit 101 according to this embodiment includes a map in which a relationship between the vehicle speed V and the distribution gains Ger and Gib is defined and calculates the distribution gains Ger and Gib based on the vehicle speed V with reference to the map. The current distribution gain Ger has a larger value when the vehicle speed V is high than when the vehicle speed V is low, and the angle distribution gain Gib has a smaller value when the vehicle speed V is high than when the vehicle speed V is low. In this embodiment, the values are set such that the sum of the distribution gains Ger and Gib is "1." The calculated current distribution gain Ger is output to a multiplier 102 and the calculated angle distribution gain Gib is output to a multiplier 103.

The current axial force Fer is input to the multiplier 102, and the angle axial force Fib is input to the multiplier 103. The distributed axial force calculating unit 85 multiplies the current distribution gain Ger by the current axial force Fer using the multiplier 102, multiplies the angle distribution gain Gib by the angle axial force Fib using the multiplier 103, and sums the resultant values using an adder 104 to calculate a distributed axial force Fd. The calculated distributed axial force Fd is output to the output switching unit 92.

The tire force Ft is input to the torque converting unit 91. The torque converting unit 91 calculates a tire torque Tt around the pinion shaft 217 by multiplying the tire force Ft by a conversion factor Kp based on a rotation speed ratio of the rack and pinion mechanism 214. The calculated tire torque Tt is output to the output switching unit 92.

A determination signal Sde in addition to the distributed axial force Fd and the tire torque Tt is input to the output switching unit 92. The output switching unit 92 outputs the distributed axial force Fd as a reaction component Fir when it is determined based on the determination signal Sde that the state quantities serving as a basis of the distributed axial force Fd is not abnormal, and outputs the tire torque Tt as the reaction component Fir when at least one of the state quantities is abnormal. That is, the basic reaction force calculating unit 82 according to this embodiment acquires three forces including the current axial force Fer, the angle axial force Fib, and the tire force Ft and outputs the distributed axial force Fd based on the current axial force Fer and the angle axial force Fib or the tire torque Tt based on the tire force Ft as the reaction component Fir. When a state quantity serving as a basis of the distributed axial force Fd is abnormal, the basic reaction force calculating unit 82 decreases the contribution proportion of the abnormal axial force to the reaction component Fir (to zero) and calculates the reaction component Fir, by switching the abnormal state quantity to the tire torque Tt.

In this embodiment, the same operations and advantages as the operations and advantages in the sixth embodiment are achieved. A controller for a steering device according to an eighth embodiment will be described below with reference to the accompanying drawings. For the purpose of convenience of explanation, the same elements will be referred to by the same reference signs as in the sixth embodiment and description thereof will not be repeated.

Figure 13:
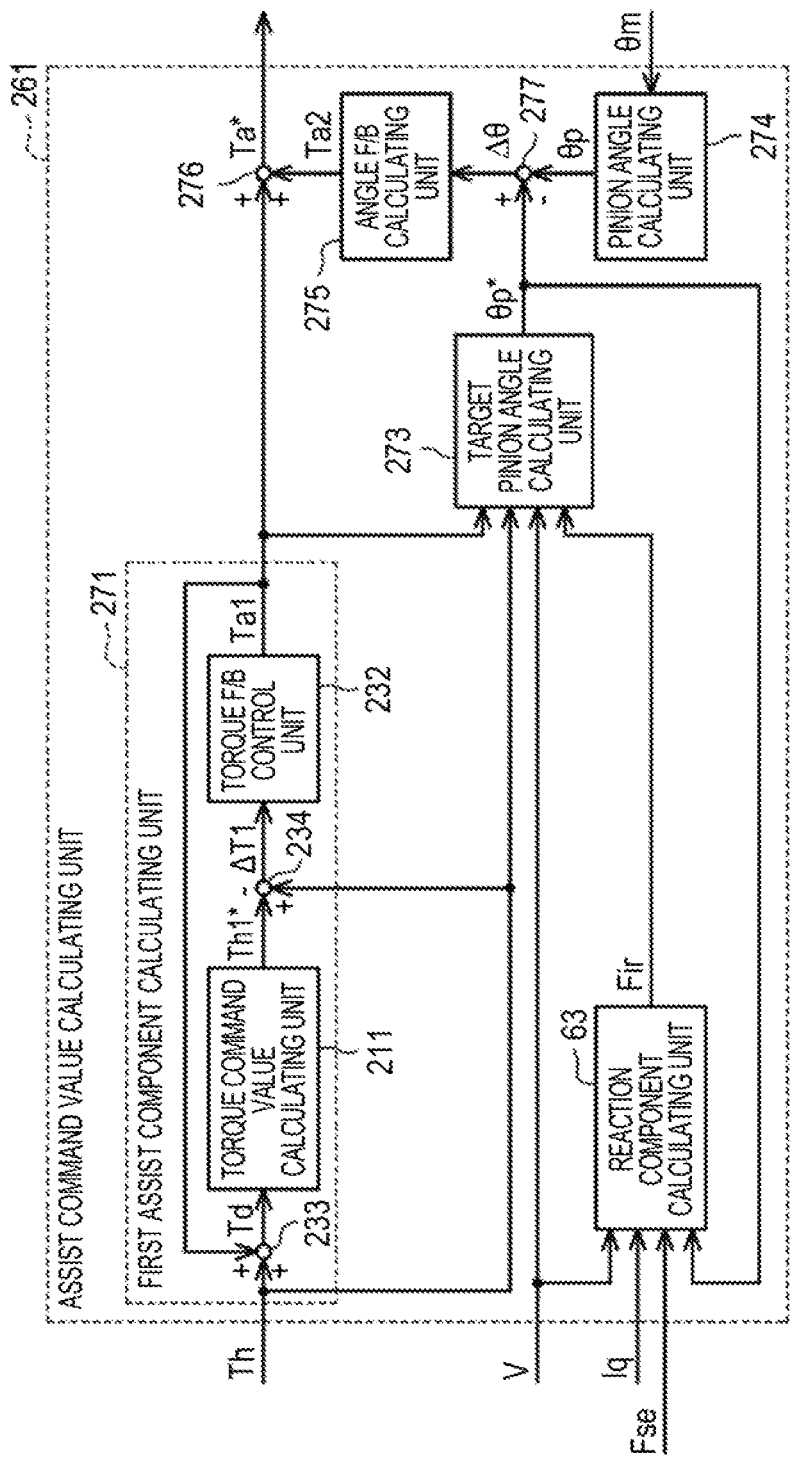
FIG. 13 is a block diagram illustrating an assist command value calculating unit according to an eighth embodiment.

As illustrated in FIG. 13, the first assist component calculating unit 271 according to this embodiment includes a torque command value calculating unit 211 that calculates a torque command value Th1* and a torque feedback control unit (hereinafter referred to as a torque F/B control unit) 232 that calculates the first assist component Ta1 by performing a torque feedback operation.

Specifically, a drive torque Td obtained by adding the first assist component Ta1 to the steering torque Th using an adder 233 is input to the torque command value calculating unit 211. The torque command value calculating unit 211 calculates a torque command value Th1* which is a target value of the steering torque Th which is to be input by a driver in response to the drive torque Td. Specifically, the torque command value calculating unit 211 calculates the torque command value Th1* having a larger absolute value as the absolute value of the drive torque Td increases.

A torque deviation ΔT1 obtained by subtracting the torque command value Th1* from the steering torque Th using a subtractor 234 is input to the torque F/B control unit 232. The torque F/B control unit 232 calculates the first assist component Ta1 as a control value for feedback controlling the steering torque Th to the torque command value Th1* based on the torque deviation ΔT1. Specifically, the torque F/B control unit 232 calculates the sum of output values of a proportional element, an integral element, and a differential element with the torque deviation ΔT1 as an input as the first assist component Ta1.

Similarly to the sixth embodiment, the calculated first assist component Ta1 is output to the target pinion angle calculating unit 273 and the adder 276 and is output to the adder 233. Accordingly, similarly to the sixth embodiment, the target pinion angle θp* is calculated by the target pinion angle calculating unit 273. The adder 276 adds the first assist component Ta1 and the second assist component Ta2 to calculate the assist command value Ta*.

Similarly to the sixth embodiment, when a state quantity is abnormal, the reaction component calculating unit 63 calculates the reaction component Fir such that the contribution proportion of the axial force based on the abnormal state quantity to the reaction component Fir (a basic reaction force) decreases.

In this embodiment, the same operations and advantages as the operations and advantages in the sixth embodiment are achieved. A controller for a steering device according to a ninth embodiment will be described below with reference to the accompanying drawings. For the purpose of convenience of explanation, the same elements will be referred to by the same reference signs as in the sixth embodiment and description thereof will not be repeated.

Figure 14:
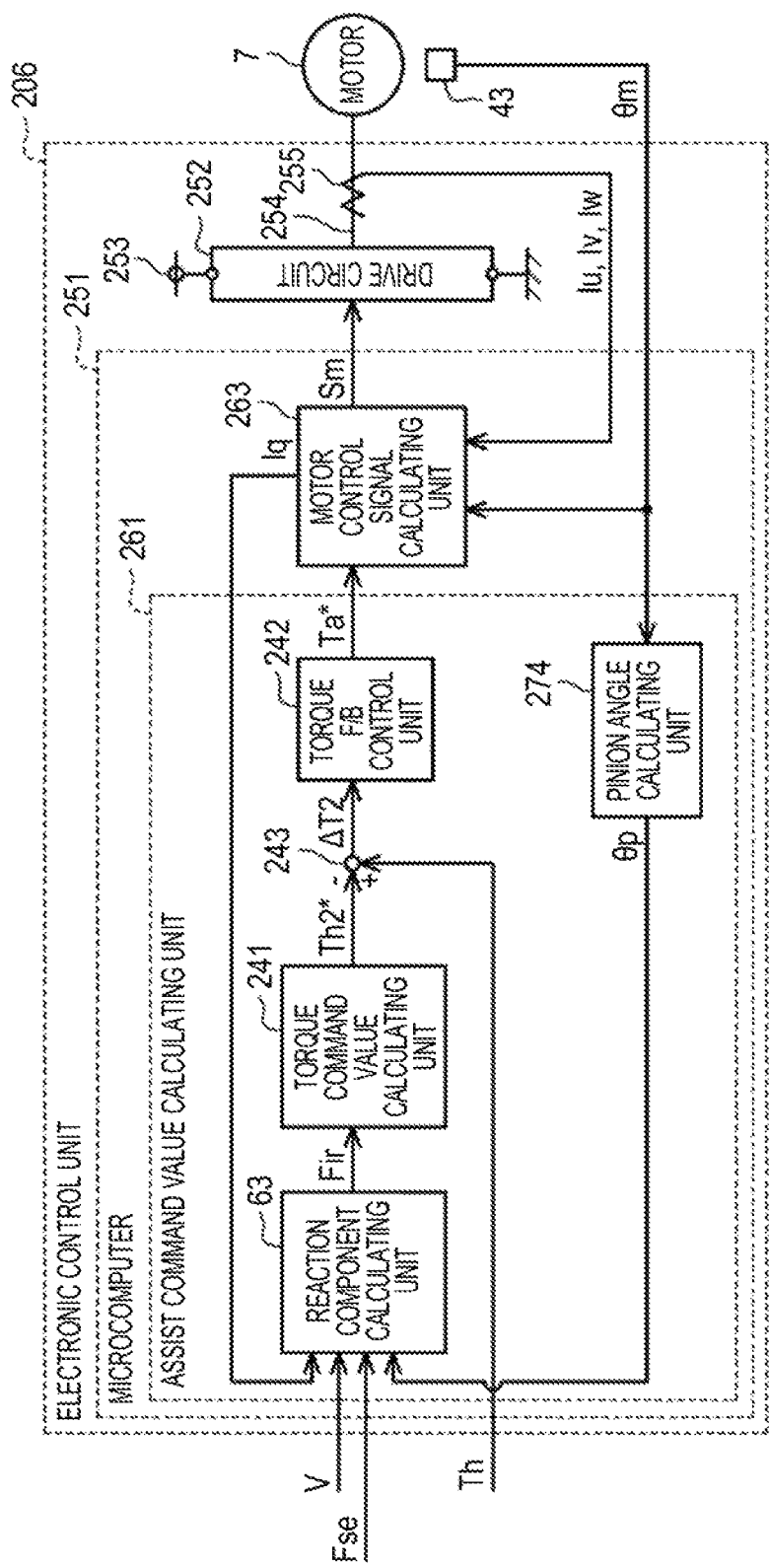
FIG. 14 is a block diagram illustrating a steering control system according to a ninth embodiment.

As illustrated in FIG. 14, the assist command value calculating unit 261 according to this embodiment includes a reaction component calculating unit 63, a pinion angle calculating unit 274, a torque command value calculating unit 241, and a torque F/B control unit 242, and does not include the first assist component calculating unit 271 and the target pinion angle calculating unit 273. The pinion angle calculating unit 274 calculates a pinion angle θp similarly to the sixth embodiment.

A vehicle speed V, a sensor axial force Fse, a q-axis current value Iq, and a pinion angle θp are input to the reaction component calculating unit 63. That is, the pinion angle θp instead of the target pinion angle θp* is input to the reaction component calculating unit 63 according to this embodiment. The reaction component calculating unit 63 calculates a reaction component Fir in the same way as in the sixth embodiment, except that the angle axial force calculating unit 84 calculates the angle axial force Fib based on the pinion angle θp instead of the target pinion angle θp*.

The torque command value calculating unit 241 calculates a torque command value Th2* having a larger absolute value as the absolute value of the reaction component Fir increases. A torque deviation ΔT2 obtained by subtracting the torque command value Th2* from the steering torque Th using a subtractor 243 is input to the torque F/B control unit 242. The torque F/B control unit 242 calculates the assist command value Ta* as a control value for feedback controlling the steering torque Th to the torque command value Th2* based on the torque deviation ΔT2. Specifically, the torque F/B control unit 242 calculates the sum of output values of a proportional element, an integral element, and a differential element with the torque deviation ΔT2 as an input as the assist command value Ta*.

Similarly to the sixth embodiment, when a state quantity is abnormal, the reaction component calculating unit 63 calculates the reaction component Fir such that the contribution proportion of the axial force based on the abnormal state quantity to the reaction component Fir (a basic reaction force) decreases.

In this embodiment, the same operations and advantages as the operations and advantages in the sixth embodiment are achieved. This embodiment can be modified as follows. This embodiment and the following modified examples can be combined with each other in a technical consistent range.

In the eighth embodiment, the assist command value Ta* is calculated by adding the first assist component Ta1 and the second assist component Ta2, but the disclosure is not limited thereto. For example, the second assist component Ta2 may be calculated as the assist command value Ta* without any change.

in the sixth, eighth, and ninth embodiments, the reaction component Fir is calculated based on the current axial force Fer, the angle axial force Fib, and the sensor axial force Fse, but the disclosure is not limited thereto and the reaction component Fir may be calculated using an axial force which is estimated based on another state quantity in addition to or instead of the axial forces. Examples of the axial force include a vehicle state quantity axial force which is calculated based on a yaw rate and a lateral acceleration and a tire axial force which is calculated based on the tire force Ft. Similarly, in the seventh embodiment, the distributed axial force Fd may be calculated using another state quantity.

In the seventh embodiment, the distributed axial force Fd or the tire torque Tt is output as the reaction component Fir according to the result of abnormality determination. However, the configuration of switching the output according to the determination result is not limited thereto. For example, the angle axial force Fib and the current axial force Fer may be input to the output switching unit 92, one of the current axial force Fer and the angle axial force Fib may be output when both state quantities are normal, and the other may be output when the state quantity serving as a basis of the one axial force is abnormal.

In the sixth, eighth, and ninth embodiments, when one of the current axial force Fer, the angle axial force Fib, and the sensor axial force Fse is abnormal, the distribution gains Ger, Gib, and Gse which are multiplied by the abnormal axial force are set to zero, but the disclosure is not limited thereto and the distribution gains Ger, Gib, and Gse may be set to values greater than zero as long as they are less than that when there is no abnormality. Accordingly, since an influence of the abnormal axial force on the value of the reaction component Fir decreases, it is possible to prevent the assist command value Ta* from being an abnormal value.

In the sixth, eighth, and ninth embodiments, when one of the current axial force Fer, the angle axial force Fib, and the sensor axial force Fse is abnormal, the distribution gains Ger, Gib, and Gse which are multiplied by the axial forces other than the abnormal axial force are increased, but the disclosure is not limited thereto and the distribution gains Ger, Gib, and Gse which are multiplied by the axial forces other than the abnormal axial force may not be changed.

In the above-mentioned embodiments, the abnormality determining unit 81 determines whether the value of each state quantity is abnormal, and determines that an axial force is abnormal when the state quantity for calculating the axial force is abnormal. However, the disclosure is not limited thereto and it may be determined whether an arithmetic operation process (for example, an arithmetic operation process of the current axial force calculating unit 83 of calculating the current axial force Fer based on the q-axis current value Iq) is abnormal in addition to or instead of the determination and it may be determined whether the axial force is abnormal based on the result of determination. The method of determining whether there is an abnormality can be appropriately changed.

In the above-mentioned embodiments, the current axial force Fer is calculated based on the q-axis current value Iq, but the disclosure is not limited thereto and the current axial force Fer may be calculated, for example, based on the q-axis target current value Iq*. In the sixth to eighth embodiments, the angle axial force Fib is calculated based on the target pinion angle θp* and the vehicle speed V, but the disclosure is not limited thereto and the angle axial force Fib may be calculated based on only the target pinion angle θp*. Similarly, in the ninth embodiment, the angle axial force Fib may be calculated based on only the pinion angle θp. For example, the angle axial force Fib may be calculated using another method of considering another parameter such as the steering torque Th or the vehicle speed V.

In the seventh embodiment, the distributed axial force calculating unit 85 may calculate the distribution gains Ger and Gib in consideration of a parameter other than the vehicle speed V. For example, in a vehicle in which a drive mode indicating a set state of a control pattern of an onboard engine or the like can be selected out of a plurality of drive modes, the selected drive mode may be used as a parameter for setting the distribution gains Ger and Gib. In this case, a configuration in which the distributed axial force calculating unit 85 includes a plurality of maps having different tendencies for the vehicle speed V depending on drive modes and the distribution gains Ger and Gib are calculated with reference to the maps can be employed.

In the above-mentioned embodiments, the reaction component calculating unit 63 may calculate a value in which the distributed axial force Fd or a reaction force other than the tire torque Tt is reflected as the reaction component Fir. For example, an end reaction force which is a reaction force resisting further return steering may be employed as such a reaction force when the absolute value of the steering angle θh of the steering wheel 11 approaches a steering angle threshold value. For example, the pinion angle θp at a virtual rack end position which is set to be closer to a neutral position than a mechanical rack end position at which movement in the axial direction of the rack shaft 222 is regulated by causing the rack end 18 to come in contact with the rack housing 213 can be used as the steering angle threshold value.

In the above-mentioned embodiments, the target pinion angle calculating unit 273 may calculate the target pinion angle θp* using a model formula to which a so-called spring term is added using a spring constant K which is determined based on specifications of suspension, wheel alignment, and the like.

In the above-mentioned embodiments, the electronic control unit 206 employs the EPS 200 of the type in which the assist mechanism 6 applies an assist force to the rack shaft 222 via the transmission mechanism 220 and the conversion mechanism 223 as a control object, but the disclosure is not limited thereto and may employ, for example, a steering device of a type in which a motor torque is applied to the column shaft 215 via a reduction gear as a control object.

Technical spirits which can be understood from the embodiments and the modified examples will be supplemented below: A controller for a steering device in which the basic reaction force calculating unit calculates a distributed axial force which is obtained by adding the axial forces of a plurality of types at distribution proportions which are individually set or the tire force as the basic reaction force.

What is claimed is:

1. A controller for a steering device in a vehicle, the controller comprising:
   an electronic control unit configured to control the steering device,
   the electronic control unit being configured to:
      acquire an action force based on a plurality of state quantities in the vehicle and to calculate a basic reaction force based on the action force, the action force including at least two of axial forces of a plurality of types and a tire force, the axial forces of the plurality of types being applied to a turning shaft that is connected to turning wheels in the vehicle, and the tire force being applied to the turning wheels, wherein the plurality of state quantities being used to acquire the action force includes a current value of a turning-side motor of the vehicle, a target steering angle, and a vehicle speed, determine, for each one of the plurality of state quantities including the current value of the turning-side motor of the vehicle, the target steering angle, and the vehicle speed, whether or not a respective state quantity is abnormal indicating that the respective state quantity has an impossible value or a change from a previous value that is greater than a preset threshold, when one of the plurality of state quantities is determined to be abnormal,
  determine that a predetermined force of the action force which is acquired based on the one of the plurality of state quantities is abnormal, and
  calculate the basic reaction force using a contribution proportion of the predetermined force to the basic reaction force that is lower than a preset contribution proportion of the predetermined force to the basic reaction force, the preset contribution proportion being a value that is stored and is used to calculate the basic reaction force when the predetermined force is not abnormal, determine a steering reaction force based on the calculated basic reaction force, and apply the steering reaction force, which is a force resisting steering of the vehicle, to the steering device of the vehicle.

2. The controller for the steering device according to claim 1, wherein the electronic control unit is configured to control the steering device having a structure in which a steering unit and a turning unit that turns the turning wheels in accordance with steering which is input to the steering unit are mechanically separated from each other,
  wherein the electronic control unit is configured to control operation of a steering-side motor that provides the steering reaction force and the steering reaction force is a force resisting the steering which is input to the steering unit,
  wherein the electronic control unit is configured to calculate the target steering angle using a reaction component based on the basic reaction force and the target steering angle is a target value of a steering angle of a steering wheel that is connected to the steering unit, and
  wherein the electronic control unit is configured to calculate a target reaction torque based on execution of angle feedback control, the angle feedback control causes the steering angle to follow the target steering angle, and the target reaction torque is a target value of the steering reaction force.

3. The controller for the steering device according to claim 2, wherein the electronic control unit is configured to, when the predetermined force is abnormal, calculate the basic reaction force such that the contribution proportion of the predetermined force to the basic reaction force is zero.

4. The controller for the steering device according to claim 2, wherein the electronic control unit is configured to, when the predetermined force is abnormal, calculate the basic reaction force such that a contribution proportion of a force other than the predetermined force to the basic reaction force is higher than a contribution proportion of the force other than the predetermined force to the basic reaction force when the predetermined force is not abnormal.

5. The controller for the steering device according to claim 1, wherein the electronic control unit is configured to control the steering device having a structure in which a steering unit and a turning unit that turns the turning wheels in accordance with steering which is input to the steering unit are mechanically separated from each other,
  wherein the electronic control unit is configured to control operation of a steering-side motor that provides the steering reaction force and the steering reaction force is a force resisting the steering which is input to the steering unit, and
  wherein the electronic control unit is configured to calculate a target reaction torque based on a steering torque which is applied to the steering unit and a reaction component based on the basic reaction force and the target reaction torque is a target value of the steering reaction force.

6. The controller for the steering device according to claim 5, wherein the electronic control unit is configured to, when the predetermined force is abnormal, calculate the basic reaction force such that the contribution proportion of the predetermined force to the basic reaction force is zero.

7. The controller for the steering device according to claim 5, wherein the electronic control unit is configured to, when the predetermined force is abnormal, calculate the basic reaction force such that a contribution proportion of a force other than the predetermined force to the basic reaction force is higher than a contribution proportion of the force other than the predetermined force to the basic reaction force when the predetermined force is not abnormal.

8. The controller for the steering device according to claim 1, wherein the electronic control unit is configured to control the steering device having a structure in which a steering unit and a turning unit that turns the turning wheels in accordance with steering which is input to the steering unit are mechanically separated from each other,
  wherein the electronic control unit is configured to control operation of a steering-side motor that provides the steering reaction force and the steering reaction force is a force resisting the steering which is input to the steering unit, and
  wherein the electronic control unit is configured to calculate a target reaction torque using a reaction component based on the basic reaction force and the target reaction torque is a target value of the steering reaction force.

9. The controller for the steering device according to claim 8, wherein the electronic control unit is configured to, when the predetermined force is abnormal, calculate the basic reaction force such that the contribution proportion of the predetermined force to the basic reaction force is zero.

10. The controller for the steering device according to claim 8, wherein the electronic control unit is configured to, when the predetermined force is abnormal, calculate the basic reaction force such that a contribution proportion of a force other than the predetermined force to the basic reaction force is higher than a contribution proportion of the force other than the predetermined force to the basic reaction force when the predetermined force is not abnormal.

11. The controller for the steering device according to claim 1, wherein the electronic control unit is configured to control the steering device that applies an assist force for assisting a steering operation to a steering mechanism using an assist mechanism with a motor as a drive source,
wherein the electronic control unit is configured to calculate a first assist component based on a steering torque,
wherein the electronic control unit is configured to calculate a target rotation angle using a reaction component based on the basic reaction force and the target rotation angle is a target of a rotation angle of a rotation shaft which is able to convert a turning angle of the turning wheels,
wherein the electronic control unit is configured to calculate a second assist component through execution of angle feedback control based on the rotation angle and the target rotation angle, and
wherein the electronic control unit is configured to control operation of the motor such that an assist force according to an assist command value based on the first assist component and the second assist component is generated.

12. The controller for the steering device according to claim 11, wherein the electronic control unit is configured to, when the predetermined force is abnormal, calculate the basic reaction force such that the contribution proportion of the predetermined force to the basic reaction force is zero.

13. The controller for the steering device according to claim 11, wherein the electronic control unit is configured to, when the predetermined force is abnormal, calculate the basic reaction force such that a contribution proportion of a force other than the predetermined force to the basic reaction force is higher than a contribution proportion of the force other than the predetermined force to the basic reaction force when the predetermined force is not abnormal.

14. The controller for the steering device according to claim 1, wherein the electronic control unit is configured to control the steering device that applies an assist force for assisting a steering operation to a steering mechanism using an assist mechanism with a motor as a drive source,
wherein the electronic control unit is configured to calculate a torque command value and the torque command value is a target value of a steering torque which is to be input to the steering mechanism,
wherein the electronic control unit is configured to calculate a first assist component through execution of torque feedback control based on the steering torque and the torque command value,
wherein the electronic control unit is configured to calculate a target rotation angle using a reaction component based on the basic reaction force and the first assist component and the target rotation angle is a target of a rotation angle of a rotation shaft which is able to convert a turning angle of the turning wheels,
wherein the electronic control unit is configured to calculate a second assist component through execution of angle feedback control based on the rotation angle and the target rotation angle, and
wherein the electronic control unit is configured to control operation of the motor such that the assist force according to an assist command value based on the second assist component is generated.

15. The controller for the steering device according to claim 14, wherein the electronic control unit is configured to, when the predetermined force is abnormal, calculate the basic reaction force such that the contribution proportion of the predetermined force to the basic reaction force is zero.

16. The controller for the steering device according to claim 14, wherein the electronic control unit is configured to, when the predetermined force is abnormal, calculate the basic reaction force such that a contribution proportion of a force other than the predetermined force to the basic reaction force is higher than a contribution proportion of the force other than the predetermined force to the basic reaction force when the predetermined force is not abnormal.

17. The controller for the steering device according to claim 1, wherein the electronic control unit is configured to control the steering device that applies an assist force for assisting a steering operation to a steering mechanism using an assist mechanism with a motor as a drive source,
wherein the electronic control unit is configured to calculate a torque command value using a reaction component based on the basic reaction force and the torque command value is a target value of a steering torque which is to be input to the steering mechanism,
wherein the electronic control unit is configured to calculate an assist command value through execution of torque feedback control based on the steering torque and the torque command value, and
wherein the electronic control unit is configured to control operation of the motor such that the assist force according to the assist command value is generated.

18. The controller for the steering device according to claim 17, wherein the electronic control unit is configured to, when the predetermined force is abnormal, calculate the basic reaction force such that the contribution proportion of the predetermined force to the basic reaction force is zero.

19. The controller for the steering device according to claim 17, wherein the electronic control unit is configured to, when the predetermined force is abnormal, calculate the basic reaction force such that a contribution proportion of a force other than the predetermined force to the basic reaction force is higher than a contribution proportion of the force other than the predetermined force to the basic reaction force when the predetermined force is not abnormal.

20. The controller for the steering device according to claim 1, wherein
the at least two of axial forces of the plurality of types are a current axial force and an angle axial force,
after determining abnormality of each of the plurality of state quantities including the current value of the turning-side motor of the vehicle, the target steering angle, and the vehicle speed;
the current value of the turning-side motor of the vehicle is input to calculation of the current axial force, and
the target steering angle and the vehicle speed are input to calculation of the angle axial force;
the calculated current axial force, the calculated angle axial force, the tire force, and an output signal from the determination of the abnormality of each of the plurality of state quantities are input to calculation of the basic reaction force.

* * * * *